(12) United States Patent
Marlin

(10) Patent No.: US 8,635,207 B2
(45) Date of Patent: Jan. 21, 2014

(54) COMPUTERIZED SYSTEM AND METHOD FOR ASSISTING IN RESOLUTION OF LITIGATION DISCOVERY IN CONJUNCTION WITH THE FEDERAL RULES OF PRACTICE AND PROCEDURE AND OTHER JURISDICTIONS

(75) Inventor: Michael Marlin, New City, NY (US)

(73) Assignee: 26-F, LLC, New City, NY (US)

( * ) Notice: Subject to any disclaimer, the term of this patent is extended or adjusted under 35 U.S.C. 154(b) by 308 days.

(21) Appl. No.: 13/011,225

(22) Filed: Jan. 21, 2011

(65) Prior Publication Data

US 2011/0184935 A1  Jul. 28, 2011

Related U.S. Application Data

(60) Provisional application No. 61/298,731, filed on Jan. 27, 2010.

(51) Int. Cl.
*G06F 17/30* (2006.01)
(52) U.S. Cl.
USPC .................................. 707/719; 707/E17.017
(58) Field of Classification Search
None
See application file for complete search history.

(56) References Cited

U.S. PATENT DOCUMENTS

| | | | |
|---|---|---|---|
| 5,875,431 A | 2/1999 | Heckman et al. | |
| 6,067,531 A | 5/2000 | Hoyt et al. | |
| 7,058,661 B2 | 6/2006 | Ciaramitaro et al. | |
| 7,222,109 B1 | 5/2007 | Flanagan et al. | |
| 7,249,114 B2 | 7/2007 | Burchetta et al. | |
| 7,472,114 B1 | 12/2008 | Rowney et al. | |
| 7,689,516 B2 | 3/2010 | Burchetta et al. | |
| 2004/0019496 A1 | 1/2004 | Angle et al. | |
| 2004/0088264 A1 | 5/2004 | Preist et al. | |
| 2004/0133526 A1 | 7/2004 | Shmueli et al. | |
| 2004/0210540 A1 | 10/2004 | Israel et al. | |
| 2004/0225619 A1 | 11/2004 | Thiessen et al. | |
| 2006/0229999 A1 | 10/2006 | Dodell et al. | |
| 2007/0226170 A1 | 9/2007 | Sun | |
| 2008/0015885 A1 | 1/2008 | Bennett | |
| 2008/0133424 A1 | 6/2008 | Myers et al. | |
| 2008/0248652 A1* | 10/2008 | Takehara | 438/710 |
| 2009/0030754 A1 | 1/2009 | McNamar | |
| 2009/0083192 A1 | 3/2009 | Bokor et al. | |
| 2009/0165026 A1 | 6/2009 | Paknad et al. | |

FOREIGN PATENT DOCUMENTS

WO  97/04410 A1  2/1997

OTHER PUBLICATIONS

International Search Report and Written Opinion from corresponding application PCT/US2011/022037.

* cited by examiner

*Primary Examiner* — Anteneh Girma
(74) *Attorney, Agent, or Firm* — Duane Morris LLP

(57) ABSTRACT

A networked data processor maintains a database of information concerning potential evidence from litigants in legal proceedings supporting stipulated discovery agreements, and requiring meet-and-confer sessions prior to seeking court supervision. Individual or adverse parties can participate. Sources include data custodians, file repositories, electronic data, witnesses, etc. Managers and employees are polled to populate a database defining the litigant's organization and evidence. The evidence may be sequestered, copied and processed, e.g., filtered for confidentiality or privilege, analyzed as to format, and queried to assess the volume of data that would be responsive under alternative discovery specifications. Cost and time are assessed under alternative specifications and reports are provided for use in negotiating a discovery plan. A stipulated discovery plan may result, or if not, a meet-and-confer session is electronically managed in a multi-user teleconference. A report of stipulated and disputed points and associated arguments can be presented to the court.

23 Claims, 15 Drawing Sheets

COMPUTERIZED SYSTEM AND METHOD FOR ASSISTING IN RESOLUTION OF LITIGATION DISCOVERY IN CONJUNCTION WITH THE FEDERAL RULES OF PRACTICE AND PROCEDURE AND OTHER JURISDICTIONS

CROSS REFERENCE TO RELATED APPLICATION

This application claims the priority of U.S. nonprovisional patent application Ser. No. 61/298,731, filed Jan. 27, 2010.

BACKGROUND

The disclosure concerns a data processing system and computer based method for efficiently managing the manner and scope of production of information by litigants and third parties in litigation, for example to meet discovery obligations.

According to the rules of procedure, civil actions are commenced by filing and serving pleadings. Parties to the litigation typically are required to make basic disclosures of information within a stated time after the close of pleadings. A discovery period follows, during which the parties are entitled to serve interrogatories and requests for production of documents on other parties, to demand responses to requests for admission, to notice testimonial depositions with or without an accompanying production of documents and things, to inspect premises, and otherwise to obtain evidence under sworn or similarly credible circumstances. Applicable rules may include, for example, the Federal Rules of Civil Procedure, counterparts of the federal rules that are applicable in state courts, local rules of court for the district or vicinage in which the action is brought, rules applicable to certain causes of action, the preferences of the particular judge, etc.

According to *The Sedona Conference Cooperation Proclamation*, July 2008, when the first uniform civil procedure rules allowing discovery were adopted in the late 1930's, "discovery" was understood as an essentially cooperative, rule-based, party-driven process, designed to exchange relevant information. The goal was to avoid gamesmanship and surprise at trial. Over time, discovery has evolved into a complicated, lengthy procedure often requiring tremendous expenditure of litigant funds, and substantial legal and judicial resources. Discovery costs can overshadow the value of a matter in dispute. The 2006 amendments to the Federal Rules specifically focused on discovery of "electronically stored information" and emphasized early communication and cooperation in an effort to streamline information exchange, and to avoid costly unproductive disputes.

Discovery rules frequently compel parties to confer regarding data preservation, procedures and forms of document production, and assertions of confidentiality and privilege. Beyond this, parties seeking aid from the court to resolve disputes during discovery, as a prerequisite typically must certify that they have made previous efforts to resolve their difficulties in good faith.

Courts see these rules as a mandate for counsel to act cooperatively. Methods to accomplish this cooperation may include:

Utilizing internal ESI discovery "point persons" to assist counsel in preparing requests and responses;
Exchanging information on relevant data sources, including those not being searched, or scheduling early disclosures on the topic of Electronically Stored Information;
Jointly developing automated search and retrieval methodologies to cull relevant information;
Promoting early identification of form or forms of production;
Developing case-long discovery budgets based on proportionality principles; and
Considering court-appointed experts, volunteer mediators, or formal ADR programs to resolve discovery disputes.

Rule 26 of the Federal Rules of Civil Procedure, entitled "General Provisions Governing Discovery; Duty of Disclosure," generally:

provides for automatic disclosure obligations
defines what is discoverable and what is limited
provides for protective orders
specifies the times at which parties may employ the various methods of discovery
provides for supplementation of responses if new information arises
requires the parties to organize their discovery process in a plan and provides for a meeting to confer on the respective plans, and,
authorizes sanctions against any party that uses discovery to thwart justice, cause undue delay, or harass the other party.

Nevertheless, there is much room for disagreement. Discovery provides opportunities for parties to engage in abusive tactics. Parties may demand information beyond that needed to verify facts stated in their pleadings. Litigants might properly cast a wide net during discovery to elicit damaging information, or might improperly demand an unnecessary scope or volume of information simply to impose costs and to apply pressure on their opponents. In some cases, responding even to limited discovery requests can be burdensome and expensive for a party required to respond, such as a case where electronic information is involved.

On the side of the party to whom a discovery request is directed, substantial man-hours may be required to review and sift through files and data processing systems in order to find each letter, memo, invoice or other document, database entry, email message, note, calendar entry, and other stored data record, that meets a discovery request. Deliberate or neglectful failure to provide information in the party's possession that is responsive to a request, can lead to sanctions. On the side of the party who receives responsive documents and information, substantial man-hours may be needed to review them. The job is more difficult and time consuming if the form of the product is not in a convenient form.

In order to manage the parties' respective obligations, agreements may be made among the parties, through counsel. Some courts routinely conduct preliminary discussions leading to a scheduling order that sets the scope and timing of some aspects of discovery. The court may require the parties to confer and to submit a proposal or a stipulated (agreed) order as to aspects of discovery. The number of interrogatories permitted, the scope of electronic discovery, the format in which data will be produced and similar details may be involved. The parties may be faced with decisions and compromises. Generally, the court strongly encourages agreement and cooperation. However, there remains a possibility of disputes.

When negotiating an agreement, and also during the discovery process, parties seek to enlarge the discovery obligations of their opponents and to limit their own obligations. During the discovery process, a party may object and decline to respond to an opponent's request on grounds of undue burden, unnecessary disclosure of confidential information, potential attorney-client privileged information or work product. Some of these objections may be resolved by an agreement and stipulated protective order. When parties cannot agree, a party aggrieved by an overly burdensome discovery request can move the court for a protective order. A party promulgating a request who believes its opponent is unreasonably refusing to cooperate can file a motion to compel requesting the court to order their opponent to answer or otherwise comply. But courts are not enthused about discovery disputes. At a minimum, the federal rules and the rules of many states and municipalities require the parties' counsel to meet and to confer, in person if possible, in an attempt to reach an agreement on issues regarding the manner and scope of discovery, as a prerequisite before a motion to compel or a motion for a protective order will be considered by the court.

It is expected that a meet-and-confer will produce a stipulated plan and/or a proposed protective order wherein the parties agree with one another as to the manner and scope of discovery after some give and take in which parties may insist on certain terms that are considered important and concede on others to reach a compromise. But discovery and discovery disputes are subject to gamesmanship and sharp dealing at times. What is needed is a way to bring order, fairness and accountability to this process.

SUMMARY

It is an aspect of the present disclosure that order and fairness are improved in the arena of discovery and discovery disputes using a programmed process. This process is apt for organizing, executing and documenting the results of meet-and-confer steps toward reaching an initial discovery plan and stipulated order, but also assists when the issues remain unresolved after a meet-and-confer session and there is a need for further sessions or intervention by the court. The same process can assist in resolving disputes at later stages before or as an adjunct to the filing of a motion to compel or a motion for a protective order. The target disputes in this context include e-discovery disputes as well as other discovery disputes that are expected to be resolved by agreements between litigants, and wherein resort to the court, whether a district judge, magistrate, special master or appointed mediator, should be regarded as a last resort.

An object is to provide an organized and substantially impartial way to raise, fully air, and resolve issues in these contexts. One aspect is to collect and make available pertinent information that assists in the evenhanded consideration of options and alternatives by the adverse parties. Another aspect is to intercede between the parties by managing presentation of alternatives and potential compromises supported by backup information, enabling the parties to fully and quickly assess the implications of going along with a compromise or alternative, e.g., the resulting costs, manpower requirements, time, etc. A benefit is to lessen any advantage that might be obtained using gamesmanship or inadequate disclosure and thus reduce the incentive to engage in such tactics.

Another object is to record and document the progress of the meet-and-confer process, through one or many sessions, including the issues raised, the options considered and the respective parties' positions. Keeping a record and generating a report in a computerized and evenhanded manner while also recording the parties' positions tends to expose demands that are unreasonable. In the event that no agreement is reached and the matter is presented for resolution by the court, such unreasonableness may guide the court in dealing with the parties' demands.

For these and other objects, a programmed computer system is established, coupled to a database configured to maintain pertinent information on the litigants and their staffs and situations. Some of this information defines available sources of evidence, knowledgeable persons and relationships. The database can be populated with information obtained by prompts and responses to the entities involved. In an alternative embodiment, the database can be at least partly populated using automated processing steps to glean information from a litigant's systems, such as email systems, document managers, personnel databases, billing and accounting systems and the like.

The programmed computer system preferably, although optionally, is used by both adverse parties, so that comparable responses to comparable inquiries are available in the database of information, enabling a relatively direct comparison. The information collected by or with respect to a litigant party (plaintiff, defendant, third party, etc.) is kept secure from disclosure to other parties unless and until disclosed deliberately. For example, a litigant may choose to disclose some item information in order to justify a position taken during a meet-and-confer session.

The programmed system contains routines that can be executed by each of the parties independently to assess the information stored in the database. Queries can be run in anticipation or when presented with offers to agree on discovery terms. For example, one may run a query positing a potential document selection criteria, timing of production, manner of production, format of data produced, potential handling of assertions of confidentiality or privilege, etc. The programmed system is configured to report information for assessing costs (time, expense, etc.) and benefits (e.g., number and nature of selected documents). Among other queries, a query may be intended to assess the size of the universe of information to be searched in response to requests. A query may actually execute a selection, for example to count or identify documents or document descriptions that a particular query will produce, for assessing associated costs and time commitments that may be involved. In one embodiment, the programmed system can execute calls to other data processing systems such as email or document management systems, to effect this aspect. A single party running queries on their own information in the database is empowered by such knowledge, namely informed about the implications of agreement to particular terms. Where adverse parties are both using the system, parties can agree to exchange certain information, with the knowledge that information reported on behalf of their opponent was produced in the same way as information that they report. This provides a basis for parties to confidently and fairly balance their costs and benefits against those of their opponent.

Among other aspects, the process enables the assessment of the number of witnesses, identification of information custodians, definition of the hierarchies of personnel and business unit management, the location and character of data stores, and various other pieces of information that are pertinent to discovery planning and resolution of discovery disputes.

Preferably, the programmed system includes options to proceed through a programmed series of topics for agreement or disagreement. These topics can be default sequences related to common discovery disputes. In connection with a meet-and-confer for negotiating an initial discovery plan, the default sequences may differ based on differences between causes of action. Thus a tort claim for personal injury associated with negligence can use database fields and prompts for medical information, doctors, standards of care, experts, etc. By comparison, a breach of contract claim for failure to deliver or perform on a contractual obligation uses fields for profits and losses, alternative sources, and the like. Apart from default sequences and issues expected to arise in particular causes of action, the parties have the option to compose a sequence customized for the dispute at hand.

In connection with a meet-and-confer for negotiating a common discovery dispute, default sequences may be executed to address issues such as a party's refusal to answer one or more interrogatories on grounds of over-breadth, confidentiality or privilege. Another sequence can address a party's belief that an opponent's production of documents and things is deficient. Various other sequences are possible.

Points are negotiated toward an equitable agreement between the parties, who are informed of the consequences of their decisions. In the event that an agreement is reached, the programmed system is configured to document the agreement. A discovery plan is composed step by step with resolution of the issues. In the event that remaining points cannot be resolved by agreement, the programmed system generates a report for reference during meet-and-confer activities, records information generated during meet-and-confer steps, and provides an objective reference for presentation of information for a court to resolve if necessary. The report defines what was agreed and what was not, together with the parties positions on the subject, and so much of the supporting information in the database as a party chooses to disclose.

It is an object of this disclosure to specify a programmed process and a configured computer system having one or more data processors and datastores operable as databases. The programmed process enables, manages and facilitates the activities of at least one litigant, and preferably two or more adverse litigants and/or third party entities, for complying with their discovery obligations in a lawsuit. As a nonlimiting example of such obligations in the US, the Federal Rules of Civil Procedure (and especially FRCP 26(f)) exemplify such obligations. The technique is also applicable to other specific sets of rules, whether civil or criminal, ex parte or inter partes, judicial or administrative procedures, trials or appeals, etc., insofar as the respective procedures tolerate stipulations and variations by agreement.

Attorneys and administrators of law firms and litigating companies and other entities can use the disclosed system as embodied in an application operable on law firm or company servers for the benefit of the company or for firm clients. Alternatively, the system can be embodied as an independent service, preferably accessible over the web, that separately and securely maintains information for diverse parties, including adverse parties to particular litigation matters. As another alternative, the system can be operated by government entities such as municipal, county, state or federal judicial districts, seeking to reduce the workload of their judges and magistrates. In one configuration, the system is embodied as a data processing service on a secure web-accessible database having one or more data processors that provide the service to customers under license or for a fee, and preferably are capable of simultaneously serving various adverse parties and other related parties to various disputes.

The system provides an efficient technique to collect, analyze and report on information sources available to litigating parties and third parties and the characteristics of such sources. This is especially useful in connection with electronic discovery but also is applicable to discovery in general. Information is collected by programmed prompting of inquiries and collection of responses that define information custodians, managers and management hierarchies, information stores and their characteristics, etc. In connection with e-discovery, aspects of data processing systems and data, entities' policies and practices for archiving, the content and format of data, the volume of data including the volume that might result from a selection criterion according to one specification or another, and similar information is collected to develop an objective description of the universe of available information. The litigant parties and their counsel gain an understanding of pertinent characteristics of their systems and data, and those of their opponent, in a forum that is generally secure against inadvertent disclosure of sensitive or privileged information.

In a programmed manner, this understanding is applied to the litigation matter in question. The potential results of discovery according to one scope or another can be assessed. Different options and scenarios are tested. In e-discovery, procedures and their implications of cost, burden, resources, time, etc. are tested and reported. The information enables the parties to take informed positions with regard to key decision points (such as document selection specifications) for e-discovery. The information facilitates a meet-and-confer session, while limiting the opportunity for posturing and bluffing. When necessary because agreement cannot be reached on one or more elements, a report is produced in a form useful for the court to undertake a final resolution.

The foregoing objects and aspects are embodied in a networked data processor that maintains a database of information concerning potential evidence from litigants in legal proceedings supporting stipulated discovery agreements, and requiring meet-and-confer sessions prior to seeking court supervision. Individual or adverse parties can participate. Sources include data custodians, file repositories, electronic data, witnesses, etc. Managers and employees are polled to populate a database defining the litigant's organization and evidence. The evidence may be sequestered, copied and processed, e.g., filtered for confidentiality or privilege, analyzed as to format, and queried to assess the volume of data that would be responsive under alternative discovery specifications. Cost and time are assessed under such alternative specifications; and reports are provided for use in negotiating a discovery plan. A stipulated discovery plan may result, or if not, a meet-and-confer session is electronically managed in a multi-user teleconference. A report of stipulated and disputed points and associated arguments can be presented to the court.

BRIEF DESCRIPTION OF THE DRAWINGS

There are shown in the drawings exemplary embodiments of the invention for purposed of illustration. The invention is not limited to the embodiments disclosed as examples and reference should be made instead to the appended claims for assessing the scope of the invention in which exclusive rights are claimed. In the drawings, FIG. 1 includes a high level design portion, generally the five blocks appearing in FIG. 1A, showing how the system of the present disclosure interfaces with, and optionally includes, an e-discovery management system.

DETAILED DESCRIPTION

The present systems and methods provide for automated management of discovery issues subject to negotiation in litigation. Usually there are two parties of which at least one is a complainant or plaintiff and at least one other is a defendant or respondent. More than two parties may be involved. Variations are possible as to the nature of the tribunal and the action, whether the matter is inter partes or ex parte, judicial or administrative, etc. The court may be more or less involved in preliminary processes such as defining a joint scheduling order. Even under an imposed joint order reached previously, there may be issue and disagreements as to how discovery is conducted when the process ensues.

The present subject matter applies to discovery obligations across a range of variations in which discovery obligations permit some variation in scope or process that can be resolved by agreement among the litigants. If no agreement is reached, rules of procedure typically impose an obligation to "meet-and-confer" before seeking a decision by the tribunal to resolve disagreements by way of motion to compel or motion for protective order.

A meet-and-confer obligation is a requirement of many courts that before certain types of motions and/or petitions will be heard by the judge, the lawyers (and sometimes their clients) must meet and confer in a good faith effort to resolve the points of difference, or at least to narrow and determine the specific points of conflict and the parties' respective positions on them. This has the beneficial effect of resolving many disputes, reducing the time and expense of briefing and arguments, and often forces the lawyers and clients to face up to the realities of their positions.

Figure 1A:
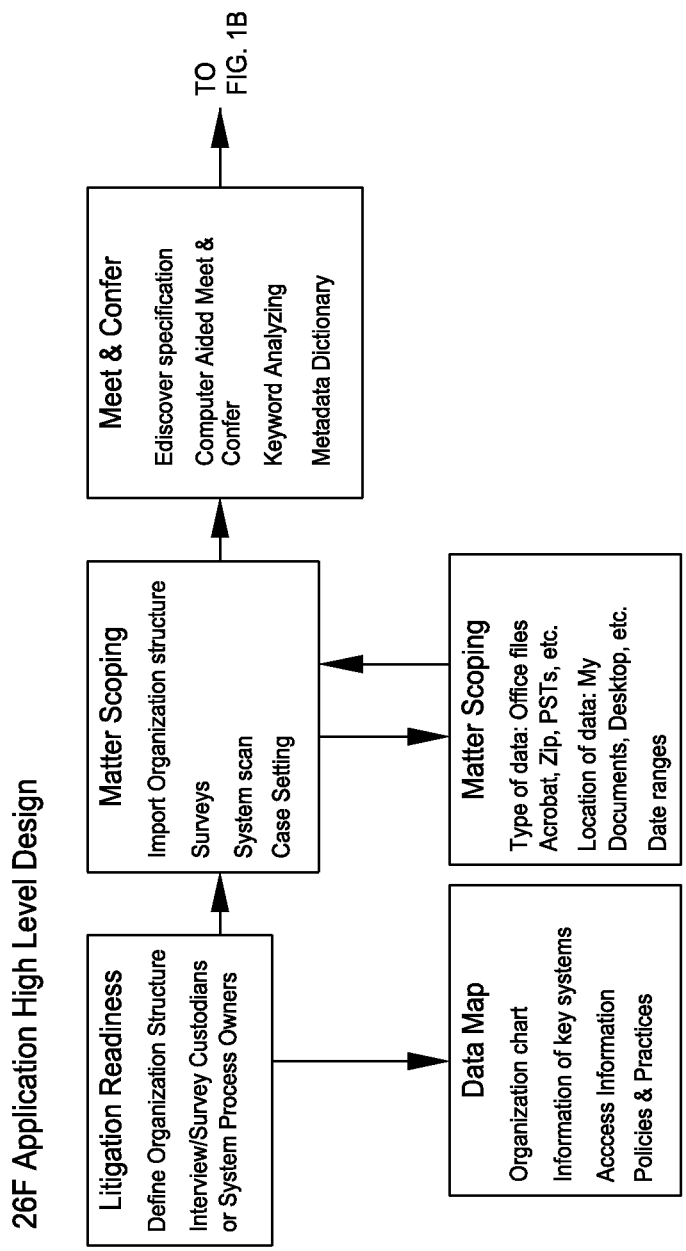
FIG. 1 is a block diagram consisting of FIGS. 1A and 1B, joined as shown, and commonly referenced as FIG. 1 in this description.
Figure 1B:
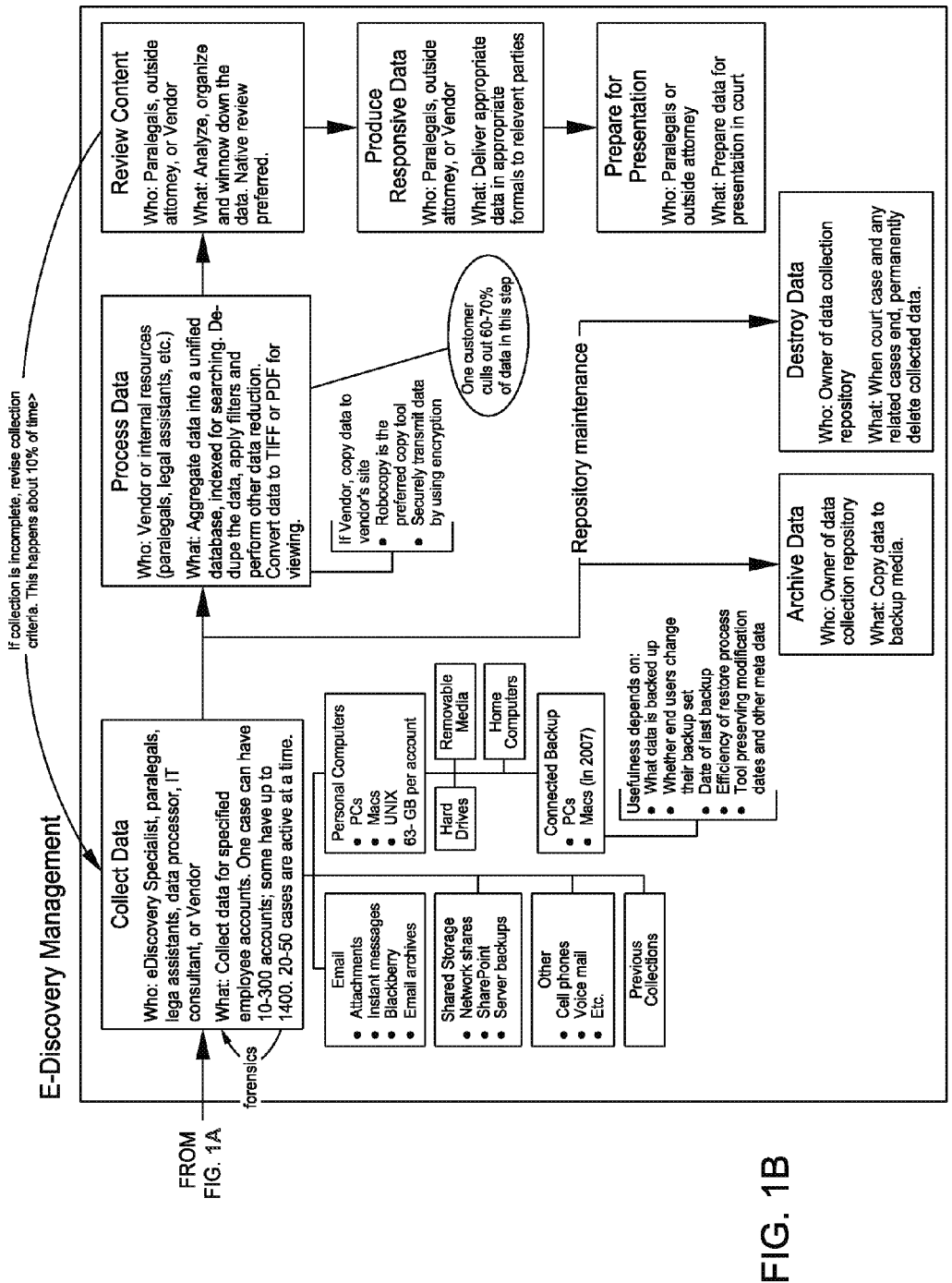

In the drawings, FIG. 1 shows how the system of the present disclosure interfaces with, and optionally can include, an e-discovery management system. As a programmed computerized method, in preparatory steps a party is defined with respect to its management, personnel (at block 21) and its data sources 23. The matter in litigation likewise is scoped at 25 (i.e., the causes of action, defenses, counterclaims and cross claims) to help define the evidence that may be pertinent. Mapping the pending or anticipated litigation to the organization entails determining the components of the organization and the persons and data sources that are involved or knowledgeable or contain information. Pertinent components can be entities, people, systems, data stores or groups or subsets thereof. The matter scoping is used to determine the nature and quantity of material data, including in particular electronically stored information (ESI) 27, and where it might be found. The matter scoping process also can be used, to manage access to information that is not electronically stored, such as paper files, requiring manually entered rather than automatically acquired information. An effort is made to negotiate points that remain open, such as specific processing steps that might be applied to the data and how the data will be presented in response to discovery request. Options are raised for handling electronic and also non-electronic data and issues, such as scheduling, handling of shipping particulars and the like. The negotiations reach a stipulated conclusion that may require a meet-and-confer session 30. Discovery requests (interrogatories, requests to produce documents and things including data files, requests to admit, testimonial depositions optionally with subpoenas duces tecum) are promulgated and answered using the stipulated specifications of the parties, or specifications imposed by the court, as to how exactly the process shall unfold.

The present disclosure provides a specially configured data processing system for managing discovery in connection with a legal proceeding. The system includes at least one data processor coupled in a digital data communication network to a plurality of terminal devices. The data processor has access to a data memory configured to maintain a database and is programmed to execute instructions. The data processor is programmed upon initiation by an administrator to execute a process for questioning at least one of managers, employees and data custodians of a party to the legal proceeding, and to populate the database from responses of the managers, employees and data custodians, with information defining the party and identifying stores of documents, data and the things that are candidates for potential evidence of the party.

The data processor is programmed for thereafter analyzing and processing the potential evidence according to a discovery specification. By assessing a volume and character of evidence responsive to at least one query, a report from the processor assists the associated party's attorney or administrator in judging how difficult or expensive it might be to obtain and possibly also to sort through and to process evidence that meets some selection and output processing criteria. The specification may be limited, for example, and apply only to certain entities, people, systems and/or data stores that have been deemed to be associated in some way with the litigation. The specification may be limited as to the data type (e.g., emails and document management system files) and/or as to content (e.g., with certain sender or recipient names or with the appearance of pertinent character strings) and/or as to a time window, or as to other aspects. The processor is programmed to test alternative specifications for assessing, for example, one or more of a volume of evidence, a data type, one or more aspects of data content, an accessibility of data, a cost of responding, and a time requirement. The processor produces a report that the attorney or administrator can compare against similar reports run according to other specifications.

Figure 2:
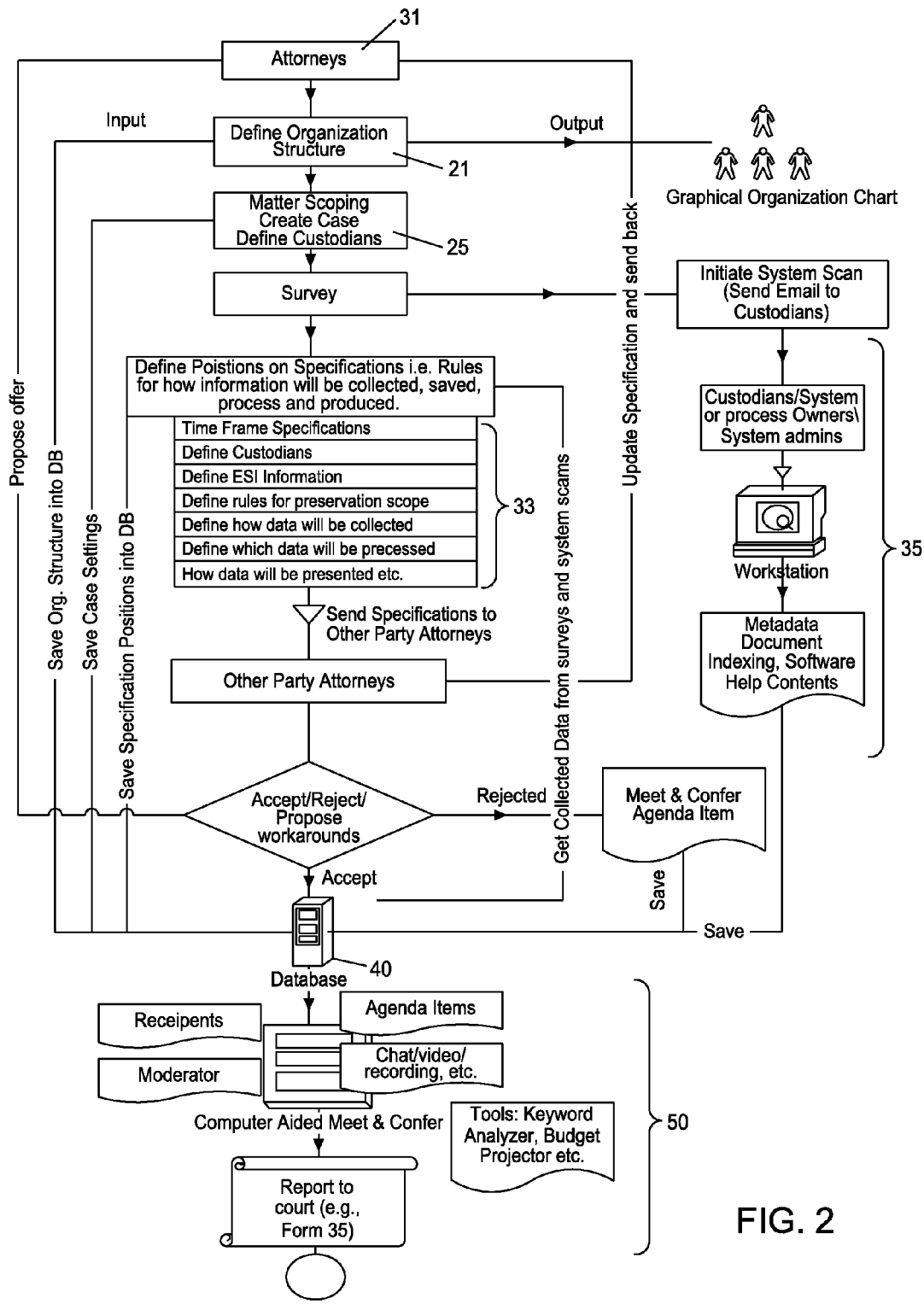
FIG. 2 is a system workflow diagram schematically showing the connections of persons, data processing hardware elements and functions supported by the programmed processors, communication paths and data storage elements disclosed herein.

FIG. 2 illustrates the overall process. Attorneys 31 or other administrators define an organization's structure 21, scope the matter 25, and conduct an automated investigation searching for data sources using a computer driven survey process 35. The resulting collected information populates a database 40. The attorneys 31 compose specifications at step 33 and propose them to their opponents who accept or reject them. If the opponents' attorneys are participating in the computerized process, they propose their own specifications in like manner. If not participating, the participating attorney may collect and summarize points proposed by the non-participating opponents and store them in the database for use as points of comparison. Issues remaining unresolved become agenda items at a computerized meet-and-confer 50.

The process begins with initiation and setup processes in which the persons, systems and repositories containing or having knowledge about information subject to discovery are found out, and identified and described in the database 40. A programmed processor 55 (shown in FIG. 3) is coupled to database 40 and via a website interface is used in conjunction with a survey process 35 to question managers, employees and/or data custodians of the party, including prompting for information defining at least one of a relationship of operational entities, a management hierarchy of the party and an association of persons with sources of potential evidence, and extending the process of questioning to include questioning the operational entities, hierarchy and persons. This can be done substantially automatically or with human assistance, e.g., from an attorney or administrator. Preferably, the system has at least some predefined survey templates, stored within the database. The templates can address topics with queries that address key technology areas important to the litigation.

This process of matter scoping is useful in that attorneys or administrators can automatically gather information. In connection with e-discovery, scoping can address overall folder structure and resident files, metadata, network drives, and programs installed. Inquiries are directed to a relevant custodian for reply and/or are conducted by automated system scanning of data stores for information associated with a defining aspect of a data store, or as identified by the relevant custodian. Preferably, the process of matter scoping also provides an interface by which the attorneys can elect to index the content of documents stored in the particular location(s) stored on the custodian's machine. This facilitates subsequent application of variant specifications to the indexed data for purposes of comparing the results that the variant specifications will produce.

According to one embodiment, the system creates an inventory of the programs installed on the custodians' computer. This inventory can include a summary of information on the software's purpose, which is useful for software that is not a widely distributed and familiar program. The summary of information can include the help files found with the software program or sufficient addressing information (directory trees or URLs) to find and review the help file contents.

The process of matter scoping can include a key word analyzer that is invoked by the attorney or administrator for a party and applied to that parties own data stores, prior to actually selecting documents or composing responses to interrogatories and requests to produced. This facility enables attorneys or administrators to define and apply potential key words and to choose or approve proposed key words as selection criteria. The process of key word selection, together with other selection criteria, enables an identification of the volume of applicable documents found to contain those key words so as to be subject to production in response to a query based on those keywords. The attorneys are enabled to generate a report which defines the volume of documents that will be returned by utilizing the key words. The report can selectively illustrate the results (e.g., document count, byte count or other parameter) in various formats, e.g., categorized by key metadata, data types, custodians. Attorneys can apply this testing to prevalent words collected using a system scan for a custodian, or a group of custodians. This word list can be limited by dates, metadata, data types or data sources. Attorneys can then select words that can be analyzed as potential key words and illustrate the results in a grid with a user selected combination of fields, e.g., one row with "custodians" and one column by "month" with entries for the number of documents that would be returned using the selection criteria that are applied.

Figure 4:
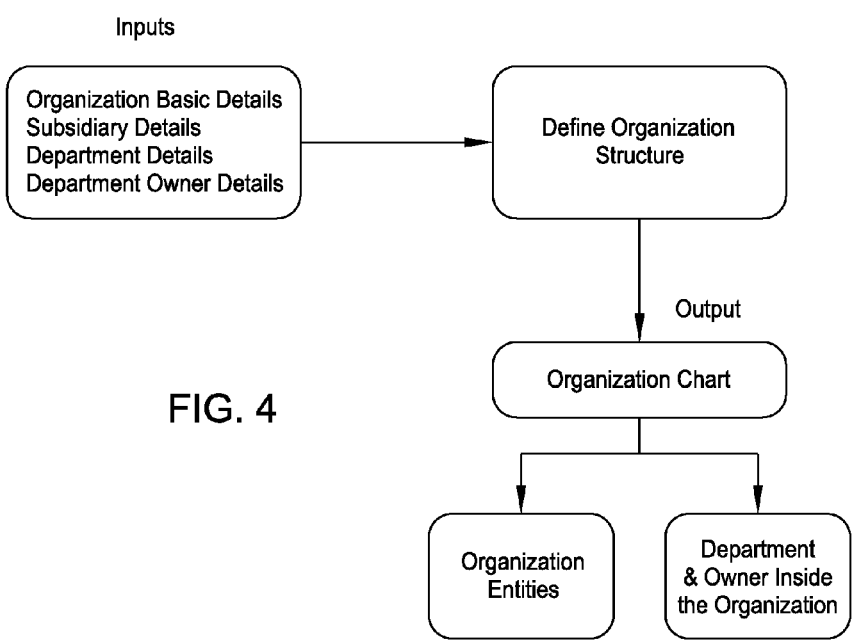
FIG. 4 is a flow chart illustrating a process associated with prompted queries/responses for defining an organization of entities and relationships, for interfacing with persons and entities of an organization.
Figure 5:
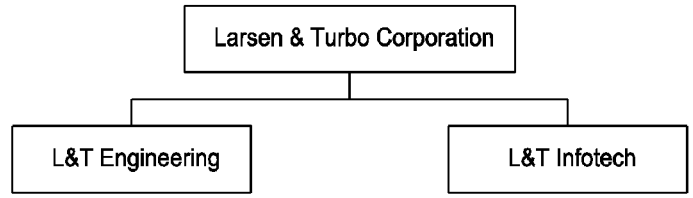
FIGS. 5 and 6 are examples of outputs from the process of FIG. 4, namely organization relationship and management hierarchy presentations.
Figure 6:
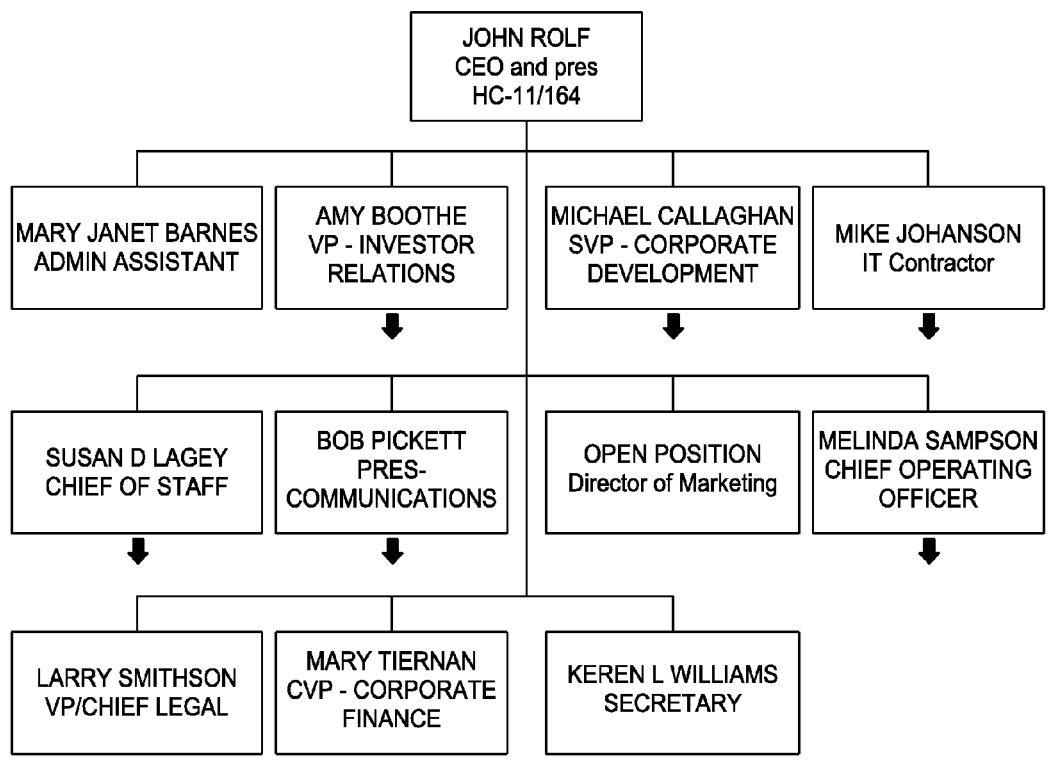
Figure 7:
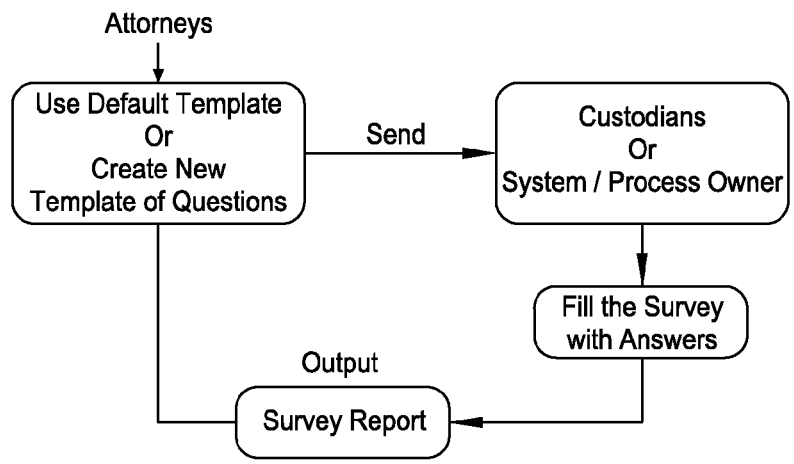
FIG. 7 is a flowchart illustrating a query/response process for interfacing with counsel for a party or a third person entity, showing optional use of default templates in questionnaires.

According to the example shown in FIG. 4, one step is to define the structure of the party's organization. This can produce a graphic chart output in a report as shown in FIGS. 5 and 6. However the information is also represented in the database 40 (FIG. 2) and is used according to the survey step shown in FIG. 7 to identify data custodians, i.e., those who have information or control sources of information that may be subjected to discovery requests.

For operation of the programmed processor(s) according to this disclosure, several roles are involved as shown diagrammatically in FIG. 2. The roles are based on job functions and security levels of persons who actually interact with the data processing system over user interfaces, e.g., by network access to particular web pages, with password log-in and secure socket layer data exchange. In one embodiment, distinct roles are provided as case administrator, legal supervisor, lead attorney, attorney, data custodian, system process owner and guest.

These roles have different security and data access levels. Case administrators, legal supervisors and lead attorneys can create cases and perform initial processing and data collection stage activities independently, i.e., without the need to involve IT staff who maintain the data processing system. Persons in these roles initiate a matter, respond to prompts that identify the type of litigation, name the parties, produce the load files and generally define the matter sufficiently to distinguish among different types of litigation that lead to particular default attributes and conditions relating to the litigation. At least one person with the case administrator role is appointed at the business in the case of a business litigant. At least one legal supervisor and/or lead attorney role is appointed at the law firm.

Legal supervisors and attorneys (the lead attorney or another attorney) generally serve to exercise the programmed processor and the associated database. These roles can define case specifications, launch a meet-and-confer process and use the case management functionality to perform analyses and review of documents, evidence and information sources for each case. The particular documents and evidence may have been collected or may still be in place at the source repositories. Information sources to be reviewed may be native or may be preprocessed, read-only or otherwise arranged. The persons in these roles can analyze the data sources and preferably their content, to identify relevant/responsive documents for their cases or to determine the character of sources or content to assess how they may be filtered or tested to produce relevant/responsive documents.

Custodians and system process owners are those persons who possess and control the data sources or at least have access to the data source contents and to information that defines or characterizes the data source contents. This preferably includes knowledge of details that are relevant to discovery specifications. The details in the case of ESI may include metadata, term indexing availability, backup copies, deletion or modification and archiving conventions, etc., in the case of documents such as word processing documents, presentations and email messages. Details for databases and spreadsheets may include variable labels, variable characteristics, variable relationships and cardinality and similar aspects of database schema, etc. Some of these aspects may be determined by routines that access the data sources, some aspects are known by the software vendor name and versions. In any event, the custodians and system process owners are the persons who complete surveys and respond to prompts that are used to populate the database that is exercised by the legal supervisors and attorneys to analyze and report on the contents of the data sources.

An additional low-security role is provided for guest users having at least certain rights to review specifications and to submit feedback. The guest user has limited access to the programmed system and to the database, for example to prevent disclosure of privileged or confidential information to the guest users. However a guest role is provided, for example, for use by an attorney for an adverse party that does not participate by operating the database 40 in the adverse party's own behalf.

Stores of documents, data and the things that are subject to discovery, i.e., candidates for potential evidence of the party, can include one or more of management information, information technology system configuration and content, paper and electronic documents and document management systems, internal and external paper, email and physical or electronic representations of messages, factual, audio and audio-visual recordings, medical and physical reports and test results, accounts payable, accounts receivable, job recording, billing records, payment records, sales information, security data, physical evidence, and persons having knowledge of selected persons, places, occurrences and things. The data store can include electronically stored information and the attributes of the data store defined in the database include at least one of a term index associated with a part of the data store, at least a summary report of hits that could be reported according to selection criteria associated with the discovery requests, a definition of one or more native formats of items in the electronically stored information, metadata associated with the electronically stored information, and a security level for the electronically stored information. Security levels can relate to technical trade secrets and know-how, sensitive business and competitive information, attorney-client privileged communications and work product.

Difficult discovery disputes can arise in connection with e-discovery and Electronically Stored Information ("ESI"). These terms refer to discovery, usually in civil litigation, wherein information stored in electronic format is to be selected by application of selection criteria to a data store, and versions of the selections are to be produced in one or more data or document formats, often after processing steps, and often subject to limitations wherein some selections are withheld entirely (e.g., privileged), or withheld subject to production of a log, or are identified as withheld from certain entities (e.g., containing confidential information and to be reviewable by attorneys only). FIG. 1 demonstrates some of the complexity associated with ESI, which is an area where issues often arise as to discovery specifications.

In general categories, the programming of the system data processor is modular and is arranged to permit users in roles authorized for appropriate levels of access to perform certain discovery tasks. The case of electronically stored information (ESI) permits some of these tasks to be handled more automatically than the case with physical items such as paper documents, but for example, the tasks include case initiation, preservation and collection of documents and things, processing and analysis of ESI, review of selected data and export of reports.

Case initiation comprises creation of a new case, identification of sources to be processed or collected from, potential identification custodians, assignment of reviewers, assignment of workload to reviewers, etc. In the case of ESI data sources, relevant content might be specified based on the nature of the ESI sources, their custodians, key words and date-ranges, among other specifics, and documents can be analyzed or processed in-place, e.g., for whether they meet selection criteria specified in a query posited on behalf of a party or expressly stated in the opponent's discovery requests.

Preservation and collection involve the imposition of legal hold in-place or copy-to-target repositories. This is a single-step targeted collection of a collection of data files, documents, or things, in manner that preserves aspects that are required. For example even though a file may be copied, the preexisting file attributes and date/time of last read or last modification as well as other attributes and metadata may need to be preserved intact. The preservation/collection may encompass an enterprises entire data collection or the documents accessible to or accessed by certain persons or groups, etc.

Processing may comprise filtering, removal of duplicates, exception reporting, PST/OST file processing, auto-coding for attributes, potential claims of privilege, and similar steps. These filtering and processing steps may be more or less exhaustive in a given situation.

Analysis may comprise detailed analytics such as email threading, selection results groupings, query analysis with term expansion (e.g., stemming, synonyms, etc.), hit-highlighting, search within search, and iterative search filtering to facilitate early-case assessment and to cull-down the selected content.

Review steps comprise distributed and collaborative native and non-native reviewing, with interactive and configurable fast tagging.

Export comprises reporting in one form or another. A final responsive dataset can be sent electronically or via a physical storage device to an external law firm or service provider utilizing the rich capabilities for load file creation, native file copying, meta-data and full-text exporting.

More generally, one or more persons or entities may have pertinent information or may have access to information sources. Persons or entities may have different sorts of access. For example, a user with an email account has access to messages and attachments that they have sent, received, saved as drafts, etc. A range of persons may have access to the shared data of many users in a document management system, often with security provisions limiting what operations are permitted (e.g., read, write, modify, update, append, delete). Information technologies department personnel may have access to users' accounts and data or to the physical media on which user data is stored. It is advantageous to deem a person with an appropriate level of access and security as the custodian of the information. Some investigation is needed in order to determine the most appropriate custodian so as to obtain all necessary data and to avoid duplication of effort.

The custodian is effectively the information source, who can provide requested information or data, or can describe or provide information respecting the data or the systems that contain it. Custodians have the ability to provide information to the attorney for a party, and thereby assist in defining specifications for information and data that may be produced in response to discovery requests rendered by another party in a particular case. By considering the organization structure of the litigants and other involved entities, and by conferring with them and considering the case requirements, attorneys for the parties may get an idea as to who can function as data custodians and who should be approached. The custodians may be employees of a party, or perhaps ex-employees. The custodians may be vendors who supply a party with data processing services, file repository companies or the like. The custodians can be third party witnesses to an event.

One aspect of the present system and methods is to assist and empower attorneys for parties to identify custodians of information and to elicit information useful to define specifications for determining information in a particular case. The specifications are determined in part by an opposing party's stated interrogatories and requests for production of documents. Proposed specifications can be composed by taking into account the interrogatories and requests for production, versus the nature and location of information available to the custodians. According to exemplary embodiments of the present system, a set of prompts or inquiries are directed to potential data custodians. The resulting information is used by the attorneys to define alternatives for the scope and nature of answers to discovery requests from a party's opponent, i.e., to determine the specifications that will apply to discovery answers.

A party's attorney presents alternatives for aspects of the specifications in offers to the opponent's attorney as part of negotiation of a discovery plan. Aspects that are not worked out previously are ultimately addressed during the meet-and-confer process. Each of the parties is typically propounding interrogatories and requests to produce as well as being faced with the proposition of answering or complying with those of their opponent.

The alternatives that might be adopted in a specification may be more or less intrusive, time consuming and/or expensive. It is normally appropriate that a comparable degree of intrusiveness, time or expense should apply to both adverse parties, but this is only a matter of negotiation. In a given situation, a party might agree to certain terms that are relatively onerous (more demanding than the terms applied to their opponent) in exchange for other terms that are considered relatively favorable.

The specifications can include information selection criteria regarding subject matter, date ranges and the like. The specification can define the character of the production, e.g., as text searchable data versus document images. Specifications can apply to a data store, a search or selection criteria, a custodian, an enterprise, etc.

It is an aspect of the present disclosure to provide for inquiries to custodians and/or testing of information sources, so as to assess the costs and benefit of alternative specifications. Table 1 is a list of specification items that an attorney may be enabled to configure into an iteration of the present method and system:

TABLE I

| Exemplary Specification Items |
| --- |
| Timeframes |
| Custodians |
| Definition of Relevant ESI |
| Systems/Data |
| Preservation Scope |
| Data Collection Process |
| Data Processing Specifications |
| Search Methodology |
| Production Format |
| Privilege Issues and Waiver |
| Cost Sharing |
| ESI Admissibility |
| Local Jurisdiction Variation |
| Deadlines |

In the context of an inter partes proceeding, an offer can be made and accepted to form a contract between the parties. Specification of these and similar items are terms in the contract. The same terms or different terms can be applicable to one or both parties in an appropriate situation. Attorneys propose terms for these specifications to the other party at the time of the meet-and-confer session. If the other party agrees to the terms, the specifications can be stated in stipulated discovery plan and/or a protective order endorsed by the court, and discovery proceeds. If one or more specifications are not agreed, the matter may be presented to the court in a motion to compel or a motion for protective order.

The discovery requirements in the US Federal Rules of Civil Procedure and the problems or challenges that are presented, are summarized below:

| Rule | Summary of Requirement | Problems With Meeting Requirements |
| --- | --- | --- |
| Rule 26(a)(1)(B): | This rule requires that parties, without awaiting a discovery request, provide to other parties a copy of, or description by category and location of, electronically stored information. | What are the systems, policies, practices, and data at the client? Which are relevant? What are the right questions? What do the answers mean? |
| Rule 26(f)(3) & (4): | This rule requires that parties confer to discuss any issues relating to preserving discoverable information and any issues related to disclosure or discovery of electronically stored information | What are the key issues that should be negotiated? What are the options? What is their implication? |
| Rule 26(b)(2)(B): | The rule provides that a party need not provide discovery of electronically stored information from sources that the party identifies as not reasonably accessible because of undue burden or cost | Which sources are burdensome? Why? |

Attorneys and administrators need to understand the nature of their own respective party's information storage arrangements, in order to assess the manner, cost and complexity of techniques by which some or all of the information might be searched for documents requested or answers to questions posed by their adversary. A party needs to disclose the nature of their information technology arrangements to their adversary in order to negotiate an agreement on the scope, method, and process for Discovery. This presents challenges for attorneys and their clients.

Legal teams for a company (both in-house and outside counsel) may not know what data the company has and/or where and how the information is embodied. The company may have an information technology (IT) department with administrators who understand the technical aspects of information storage. These persons can manipulate or explain the nature of information maintained in current systems such as accounting systems, informational databases, email systems, document managers, backup and retention practices. But the IT department may not be knowledgeable about other or prior systems. The IT department may understand its own databases and document managers and the like quite well, but be ignorant about those of the company's adversary. Also, IT administrators and engineers are not concerned with information content, as opposed to storage/retrieval and transmission technology. For these reasons, the IT department and the legal team may find it difficult to communicate meaningfully one another. Discovery management consultants and attorneys with limited IT knowledge or experience often must function as investigators and translators to develop sufficient information about the IT systems and relevant records so the company can meet its discovery burdens, and so that the legal team can negotiate effectively with the adversary's legal team to develop discovery plans. From the attorneys' perspective, the cycle may repeat anew with every case of representation of a party that has their own unique combination of email and messaging, document management, database, archiving, and other IT system components.

If attorneys do not gain sufficient understanding of their client's relevant data and systems, the attorney may not appreciate the key e-discovery issues that should be negotiated at the meet-and-confer session, what the specifications entail in cost and time, etc. This can lead to contentious discovery or to negotiation of discovery plan agreements that are unduly expensive, over-broad, and burdensome for both adversaries.

According to the present technique, automation is employed to guide and enable attorneys and their clients in complying with their legal obligations in discovery, and in particular to facilitate efficient development of discovery plans according to rule based requirements and best practices. In one embodiment, the automated system is preprogrammed with a series of queries designed to elicit response that define relevant information about custodians, files, IT systems and the like. This information is made available to the attorneys as enterprise information, can be readily made into case specifications, and has additional features enabling the attorneys to be meaningfully prepared for a meet-and-confer session. The system can enable an attorney to provide discreet information to the other party's attorneys in connection with justifying proposals made during negotiation. In the event that both adverse parties use the automated system, then both the parties can employ the present automated technique with some assurance that proposed discovery plans are compared from the same perspective, even if the details of IT email, document managers and the like are different. The inventive system provides the basis of comparison. If instead one of the parties involved in the case chooses not to use the inventive system, the party who uses the system can provide information in the form of reports and summaries that are disclosed to their adversary in discreet summary form. In one embodiment, limited online access to a server may be provided for this purpose. Thus, relevant information is made available allowing a review of what form of information is held, what information is discoverable due to potential appearance of selected words or phrases or dates (or potentially withheld on grounds of privilege or the like), who are the custodians of records, and persons knowledgeable on particular topics who may be potential deponents, the nature and history of the data sources, how much cost is attached to retrieving particular discovery items in one form or another, and similar pertinent information.

In an exemplary embodiment, the automated system develops an organization structure by application of a user friendly query/response interface that probes for custodian identities by job functions, supervisory and reporting relationships and the like. The organization structure is presented graphically in selectably varying degrees of detail. The organization management and IT arrangements can be probed separately. This information assists attorneys in determining who has or can obtain access to what information, and whom to contact. The "Manage Enterprise information" function is discussed in detail below, providing particulars of this system segment, wherein attorneys can determine, handle and present organizational details graphically.

In another embodiment, the inventive system assists in defining the overall scope of the discovery phase of the case, and is usefully extendable to the trial and testimony phases as well. The system allows attorneys to lay out case attributes, its information custodians, parameters of the case such as the scope of information available from custodians and the like, through user friendly interface.

Accordingly, and as generally shown in FIG. 2 and more particularly in FIGS. 8-12, a computerized method for managing information is provided for use in association with a legal proceeding involving at least one party. The party has a duty to produce information according to a legal standard and options as to how to meet the legal standard, which can be the subject of negotiations with other parties who advantageously also use the computerized method.

In one aspect the method includes establishing a computer system having at least one processor with a program memory and coupled to or comprising a data memory forming a database 40 containing data fields for use in at least of one legal matter such as a civil or criminal lawsuit or an administrative proceeding. The processor is also coupled to data input-output facilities such as one or more workstations or terminals. In one arrangement, the processor containing or accessing the database 40 is operated as a web server 55 in communication with multiple users and managing many legal matters and many parties and entities. For this purpose, the processor can be accessible via internet access using a browser from any terminal with web access to navigate through html webpages presented by the server to manipulate the database information associated with a particular matter and particular parties or persons.

The processor executes a programmed sequence of instructions including accepting input and presenting output to/from users, and in certain of the disclosed embodiments, is arranged to interface with servers on the users' networks to obtain electronically stored information (ESI) or to obtain information that characterizes ESI that can be made available from the users' networks (see FIG. 1). One object is to populate and to manipulate the database that stores at least a description of information available to the party, and potentially a copy of the information itself or intermediate derivative information as provided in this disclosure.

In order to characterize information sources and structures, a facility is provided for the processor to prompt or users (e.g., attorneys for parties or employees of the parties as well as their staff and agents) to enter information in determining who controls or has access to information, where information may be stored and in what format the information is stored. This information populates fields in the database, which is scalable to accommodate numerous users, numerous parties with numerous employees, and to do so for many pending litigation matters while limiting access of persons to the information associated with their enterprise only.

The organization structure (FIGS. 5, 6) is defined by storing and relating together in the database the identities, job functions, supervisory relationships, work locations, and other information of persons employed by or associated with an organization. Likewise, a structure is established in the database for scoping the case (FIG. 8), including administrative information as provided docket listings, as well as allegations in the pleadings, identifications and relationships of the persons and things associated with plaintiff(s), defendant(s), interpleaders, third parties, potential witnesses and experts, etc. In one embodiment, the processor manipulates the database under control of users to identify entities associated with electronically stored information (ESI). The entities are both humans and machines or programmed systems. The human entities may have control or access to files such as paper files and records and also ESI, such as clerks, network administrators and IT personnel and also users of the systems such as persons holding email accounts or access to document management, accounting and other programmed systems. The programmed systems and servers that are entities can include, information technology systems such as email systems, document managers, accounting and database systems, paper file storage, archiving and retrieval arrangements and the like. The database 40 is arranged to store and to provide access to information that describes and relates these entities to one another.

Preferably each hardware and software system is associated with one or more custodians. Custodians can be identified independently of data storage systems, for example as being witnesses or persons knowledgeable about events or supervisors or coworkers with others who may be custodians of information. The relationship of the data sources and the custodians to one another and to data values and relationships associated with them are discovered in the survey steps 35 and represented by field values and database relations among associated fields in the database.

Figure 8:
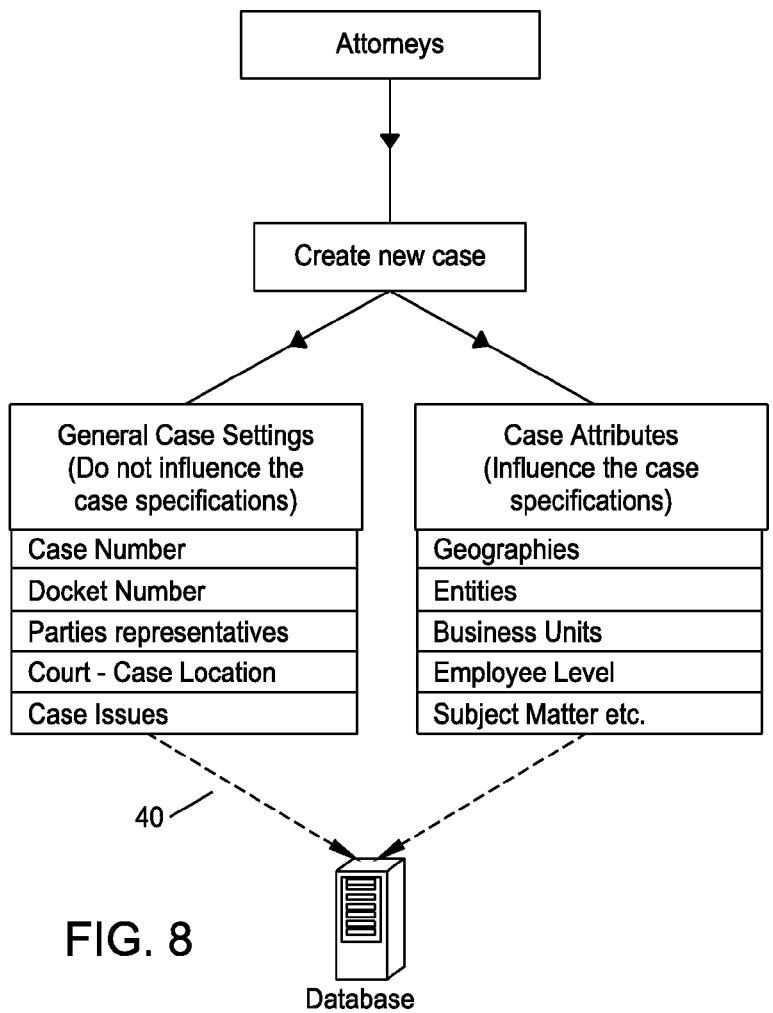
FIG. 8 is an illustration showing establishing and/or populating a database from prompted query/response interaction with an administrator, shown in this example as one of the attorneys.
Figure 9:
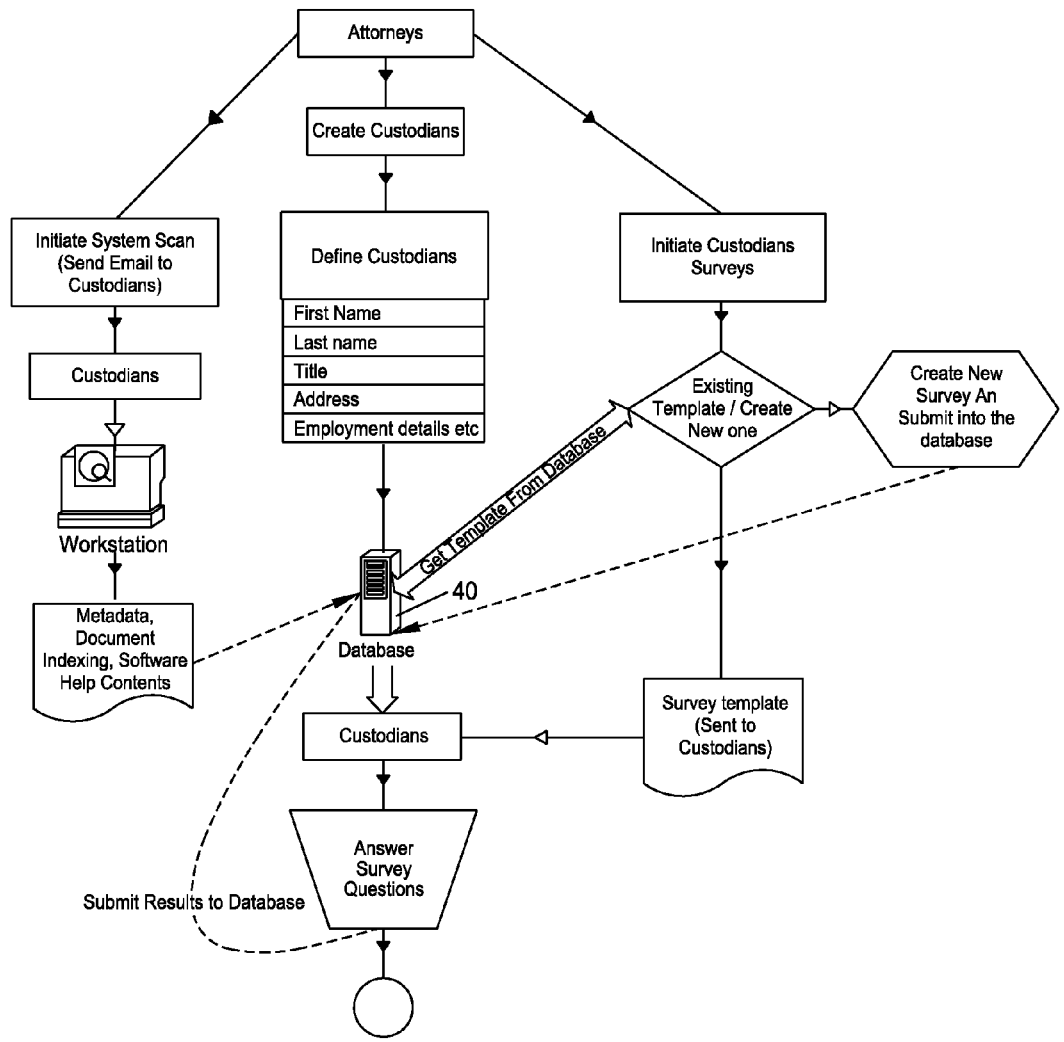
FIG. 9 is a schematic block diagram illustrating a process of defining and querying information custodians for information to populate a database that identifies and defines entities and information stores.
Figure 10:
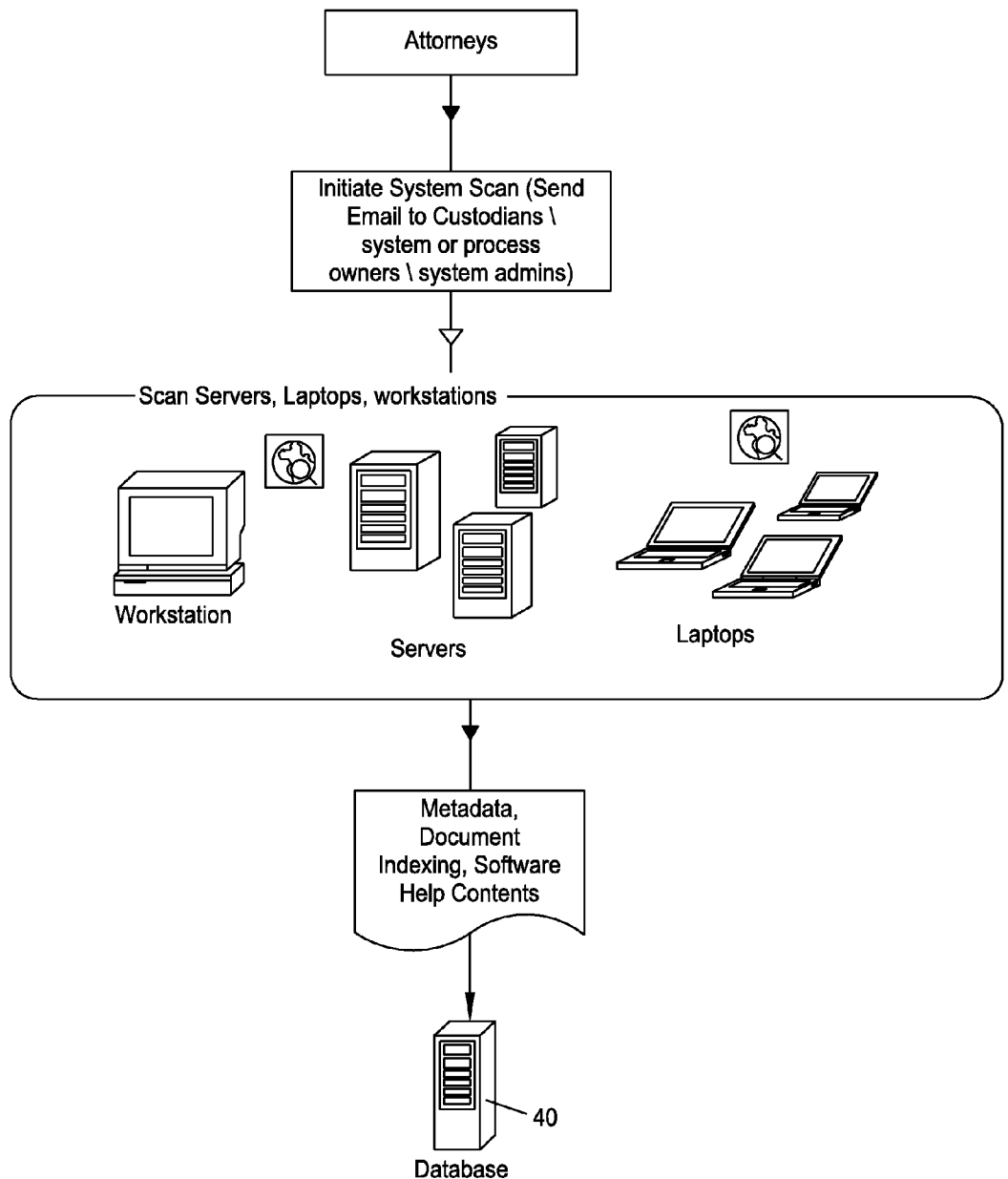
FIG. 10 is a schematic block diagram illustrating a process comprising automated analysis of digital information stores that are then represented in the database.
Figure 11:
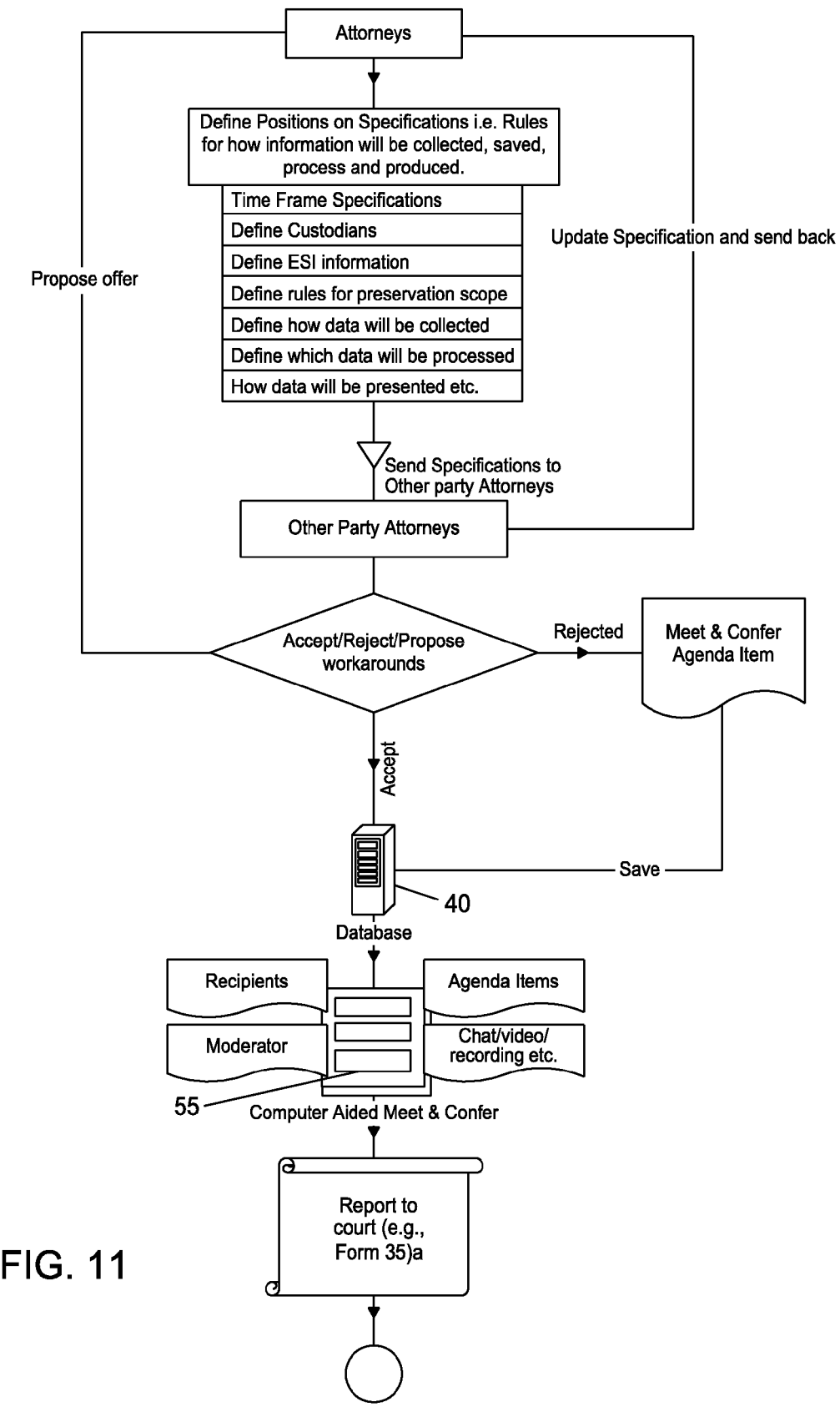
FIG. 11 is a schematic block diagram illustrating a process of applying a discovery production scenario comprising at least one specification, determining from reference to the database the implications of accepting the specification and at least tentatively accepting or rejecting the specification.
Figure 12:
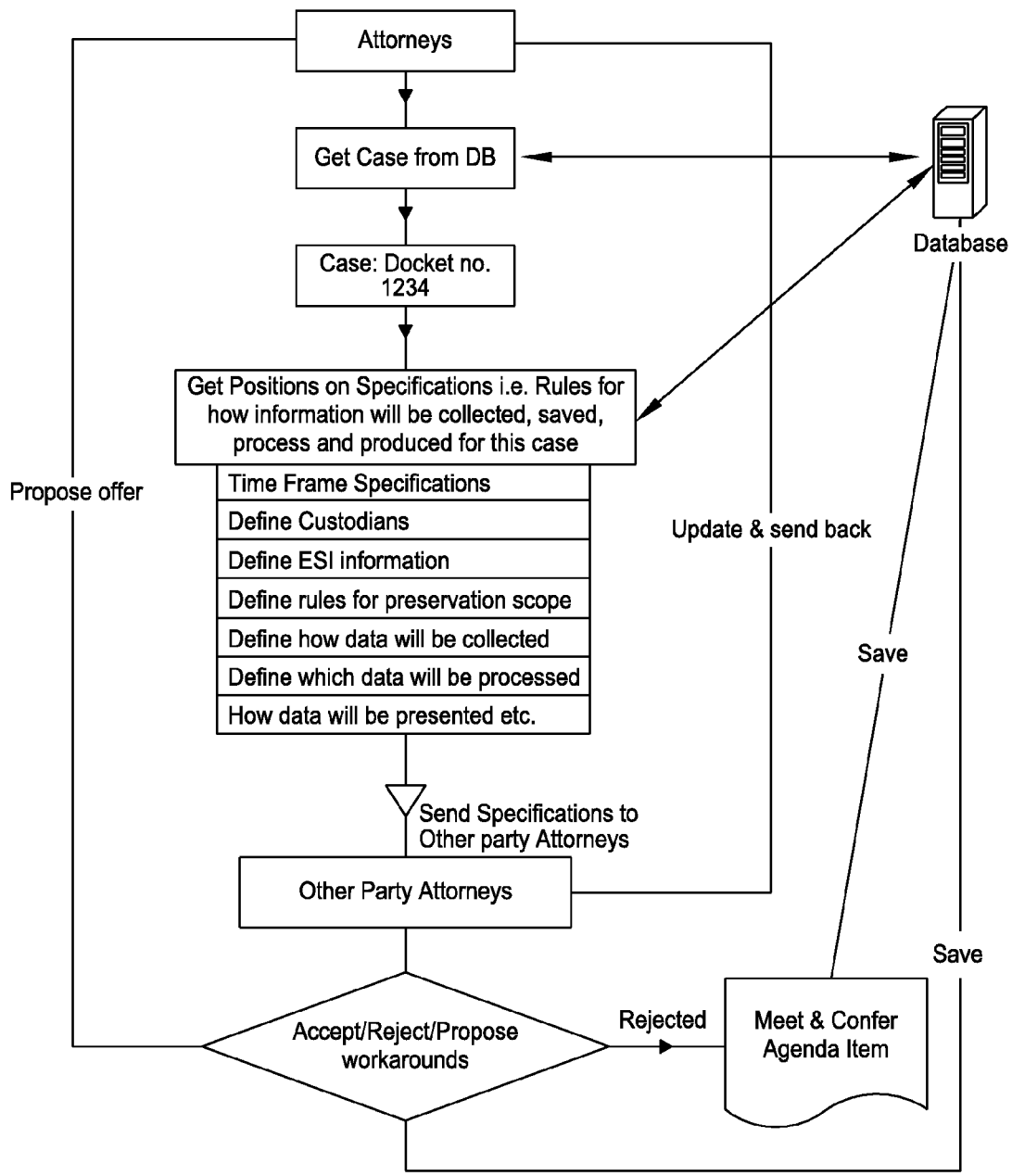
FIG. 12 is a block diagram illustrating the process of proposing a specification including positing the specification in a communication to another party's counsel, referring to the database for determining the implications of the specification, and either accepting the specification or declining it so as to generate an agenda item to be negotiated during meet-and-confer.
Figure 13:
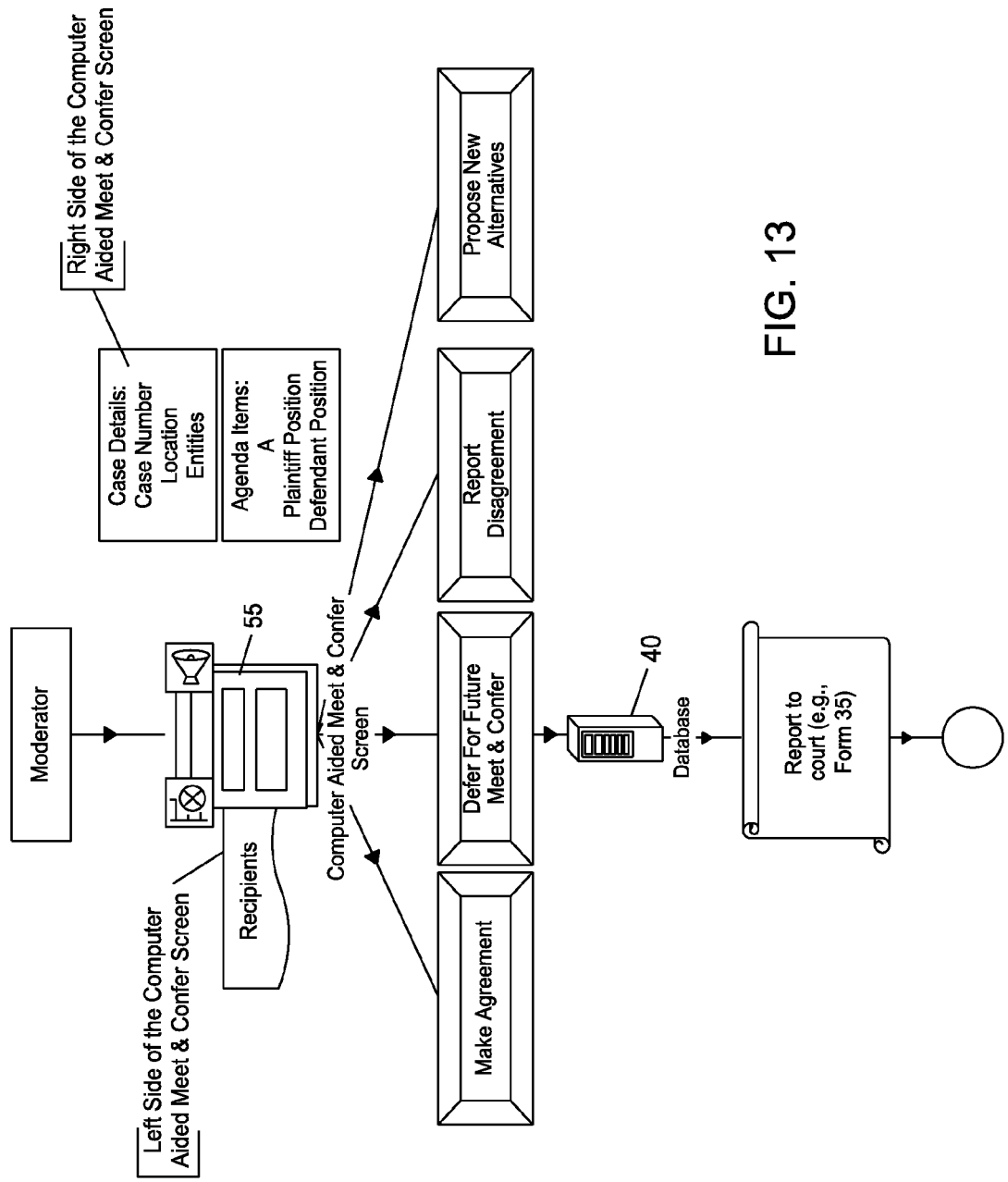
FIG. 13 is a schematic block diagram illustrating aspects of a programmed moderator or emcee routine that manages negotiation of issues presented as agenda items during a meet-and-confer session.

The causes of action and defenses are considered and the range of information that may be pertinent are stored as a set of case settings that define aspects of the case. Details associated with a cause of action can include the date of alleged wrongful activity, named persons things, etc. These aspects are associated with persons in the organization. FIGS. 8-10 show workflows associated with defining these settings.

Parties may be required to make initial disclosures that provide guidance as to the nature and location of information pertinent to claims and defenses. After exchanging initial disclosures, advantageously using reports for that purpose that are generated by the programmed processor, proposals to define variable aspects of the discover process are directed between the parties' attorneys, negotiated and either agreed upon or noted as issues to be negotiated. Among other decisions, there are variations possible in the time frame to be considered relevant, the custodians to be involved, the ESI or other data to be referenced, the scope of information to be selected, provisions for preserving information unaltered and/or as existing at a given time, procedures for collecting and reporting information that may be requested in discovery exchanges including interrogatories and requests to produce documents and things, how and when and where data will be presented, issues of privilege and confidentiality, access to information by parties or attorneys only, and generally all the associated details.

The attorneys may not agree on all the points, or assuming that over a number of iterations, the issues are addressed and resolved, during this phase, each of the attorneys has the capability through the programmed system to propose elements of the specification and to take positions approving or rejecting proposals from the other attorney(s). The meet-and-confer session mandated by the rules is aided by operation of the programmed processor, which operates as a moderator, produces an agenda for the recipients, records the reasons and arguments why parties advocate for and against particular resolutions of the issues, and offers tools that assist, for example, in estimating the costs or other implications of accepting or varying the discovery terms. As an ultimate output if no agreement is reached, the system generates report to the court (for example Form 35), to be presented to the court in connection with a scheduling conference or in motions by either or both of the parties for a protective order for an order to compel responses from their opponent.

According to one embodiment, information obtained from the sources, such as selected email messages, selected database records, transcripts of testimony and the like can be copied into the database records. However it is likewise efficient and appropriate to maintain a database containing fields that simply identify the information sources where information is stored or may be found, and the manner in which the information is maintained.

The information in the database is accessible to the programmed processor and is used to prepare reports, graphical representations, summaries and the like, to characterize one or more aspects of the information. For this purpose, the programmed system may provided for pre-defined or "canned" reports, summaries and/or graphics. Alternatively, the user or operator can be permitted to format and run reports and graphics generation routines.

Figure 3:
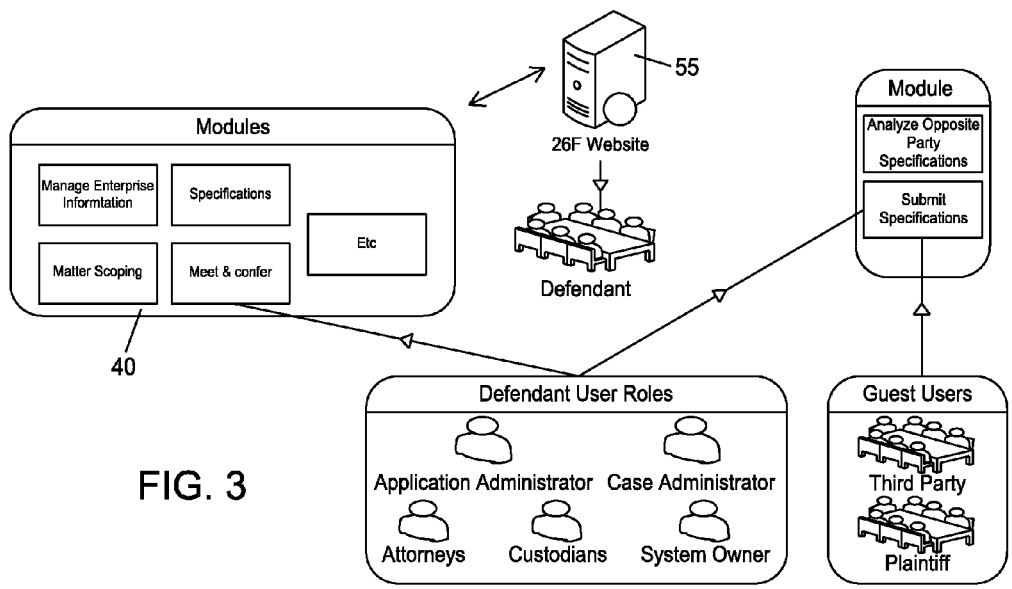
FIG. 3 is a diagram illustrating how persons and groups with different litigation interests (defendant compared to plaintiff or another party in the example) are informed of an opposing party's information source descriptions as the opposed party's proposed discovery specifications (an offer), while having more extensive access to their own information to facilitate managed negotiation of a discovery plan for all parties.

One or more parties to a litigation matter are authorized users who are licensed to use the programmed system as a software application or are licensed to log in and use the programmed system on a server. The users may have more than one litigation matter in process in the system. In connection with a given matter, one party (the defendant in FIG. 3) has access to modules for managing the enterprise information of that one party, the defendant, but does not have access to the enterprise information of the other party or parties. The defendant or defendant's counsel can scope the matter, propose specifications, manage meet-and-confer operations, etc. The users associated with the opposing party, the plaintiff in FIG. 3, can be authorized as only limited or guest users entitled to operate certain modules on the same programmed system, but without the same access to potentially sensitive information. Thus as shown in FIG. 3, the plaintiff as a guest user is permitted to propose specifications and has the ability to analyze proposed specifications but not to invoke other modules that are exclusive to their opponent.

Certain tools can be provided in the system, such as a metadata dictionary, a cost sharing calculation capability, a budget projector, a system data glossary, reference materials or links to reference materials defining aspects of commercially available data processing programs that might be maintained by litigants and so forth. This information advantageously is available at various stages of operation, including during the meet-and-confer conference. Additional helpful information, links and references can be provided to allows attorneys to view or access reports of vendor costs and specifications for services in the event agreement is to be reached to have a document production include particular forms or vendor services, such as paper copies, scanned pdf data images, pdf images that also have OCR results, etc.

In one embodiment, a metadata dictionary is provided as a reference information source and contains a listing of the metadata information that is available from operating software systems, and thus might be included in a specification. The metadata dictionary contains information as to the metadata category type, e.g., the nature of the information, and can detail aspects such as whether particular metadata values are user generated, system generated or generated by an application, how and when the values routinely are altered, etc. The metadata dictionary contains information on the metadata of commonly encountered programs, such Microsoft Word or other MS Office programs. The metadata dictionary can be supplemented by similar information that may be customized for a given setup, for example the variables that may have been defined for inclusion in the document profiles of a document management system.

In FIG. 4, a set of relationships between company branches, relationships among officers or directors and operating units, supervisory and reporting relationships among operating units, are stored in the database 40. This information generally identifies which employees and agents are associated with one another as to job function and supervision. The relationships are established in consultation with the employees and agents of the entity. Relationships can include parent and subsidiary or functional divisions as shown in FIG. 5. Similar relationships can be established for product distribution among entities such as manufacturer-wholesaler-retailer or the like. FIG. 6 illustrates a hierarchical presentation of persons. In this case unoccupied positions in a hierarchy can be indicated as well as functional relationships with non-employees (see IT contractor blocks). The presentation of the relationships is graphical, include the ability to expand and drill down into the hierarchy as shown by the downward pointing arrows.

Contact information for determining which employees are concerned in some way with the discovery process, for example having pertinent knowledge as potential witnesses, or as potential participants in preparing answers to interrogatories, or as custodians of data documents or things, is obtained by circulating queries as discussed above and shown in FIG. 7, or extracted from the organization communication system (e.g., telephone directory) and from organization management data, to facilitate attorneys identifying persons and identifying job functions of persons who might be notified for preserving information and reporting back. The targeted persons can also use the system to direct questions to the attorneys and the attorneys can apply to individuals or groups, all through the programmed system.

In one embodiment, the processor is programmed with certain capabilities to analyze individual PC systems or network enterprise applications to determine and catalog in the database 40 what applications programs, servers and data stores are available. The data stores of commercially available enterprise programs such as those that manage email addresses, phone numbers, appointments and the like can be mined for pertinent data, including, for example, to find and record particularities in the set-up and operational parameters of such systems, for example the time period or other criteria used to determine when information will be retained or archived.

The steps taken to catalog available data can be limited to minimal look-up functions, such as determining a phone number or email address from an entered name, to intensive selection criteria including full indexing and searching documents and attachments or related documents for the appearance of a name or letter string in a user's email or calendar archives, so as to establish relationships between persons.

Preferably, the programmed system determines the presence of recognized commercial systems such as document managers, messaging systems, databases of contacts or personnel, financial systems and the like. For messaging information, for example, Microsoft Outlook, Lotus Notes, LexisNexis InterAction, can be examples of defined systems whose parameters can be determined automatically, e.g., to discern the version and to identify pertinent options setting such as archiving parameters and file retention/deletion settings. After having determined that such a commercial system is present, the programmed system preferably can determine other details that are known to be associated with that type of commercial system. Such other details might include version number and configuration information, the presence of archives and options associated with archiving delays, the number, size and dates of document files that are present, and other information that is pertinent to assessing the scope and expense of an undertaking such as searching document files, emails, databases, according to some search criteria.

In one embodiment, as a part of the process of querying users, the recipients of queries and other concerned parties can be directed to acknowledge the query, to respond to inquiries, to comply with a directive to preserve data, to report the presence of data, and to invoke a programmed routine. In that case, the querying of users is at least partly interactive with an operator at queried users' terminals or logged into a network under the users' login usernames and password or similar authorizations. Alternatively and preferably interactively with a network administrator, the email and other file management accounts of users can be examined The programmed process enables attorneys to understand the organization structure, software applications and data stores of their client and of their opponents' clients. Another aspect, is to scope the nature of the case, i.e., to select from the causes of action alleged and the defenses raised, the issues that are presented and attributes including the locations, entities, business units and the like that are implicated. These aspects and attributes influence the scope of specifications that may be proposed and adopted to define the scope of discovery, generally defined to include all relevant information and evidence and also any additional information or evidence that is likely to lead to the discovery of relevant information and evidence. The process provides a framework for parties and attorneys to identify and research background information on key e-discovery issues, in advance of having to negotiate during a meet-and-confer session wherein it may be necessary or desirable for the attorneys to know the nature, scope and particular specifications of discovery that is demanded or offered by respective parties.

Supporting information helps attorneys to negotiate effectively. In applying the present system, a party's own situation is investigated by programmed queries. Responses to the queries identify and define the functions of persons and their relationships, and determine the nature and location of evidence, including but not limited to electronic data. The responses are stored and used in defining a database that is a useful collection of information from which costs and time constraints can be assessed under scenarios associated with discovery according to one scope or specifications or method of data collection versus another. In further applying the present system to the situation of the party's opponent or to third parties who likewise respond to queries and build a useful collection of information, the costs and time constraints of all the entities obliged to answer discovery inquiries can be compared with the assurance of an even playing field because the same automated systems of query, response and database organization are being used by each of the entities Accordingly, operation of the present system facilitates a review of the infrastructure, applications, and data stores of a party and an analysis by counsel. Initial disclosures required of the party can often be read out of the database as a canned report. This assists counsel with the development of required initial disclosures of their client and enables counsel to analyze the opposing parties initial disclosures. To an extent, counsel for the parties are enabled by reports and organized access to the database of information defining and in part containing their clients' respective data, to formulate proposed plans.

Frequently, through counsel the parties will agree on some aspects of discovery and disagree on other aspects. The present system includes further queries to counsel including options for indicating agreement, disagreement or qualified agreement/disagreement of a preferably comprehensive set of terms of potential agreement that will determine ongoing obligations of the parties through the discovery process. Meet-and-confer requirements of the rules of procedure are facilitated because responses to queries on agreement/disagreement are employed by the programmed system to identify points of difference. Preferably, such reports are produced for both opposing parties and/or for third parties subject to subpoena, in advance of a meeting or conference at which points of difference are negotiated (namely the "meet-and-confer" session). FIGS. 10-13 show aspects of negotiations and the meet-and-confer.

According to a further embodiment, the programmed system can be configured with appropriate software, hardware and communications to support video conference capability as well as data input from counsel for opposing parties and third parties. The system can also be operated in an in-person meeting mode via one or more terminals made accessible to the participants at the meeting place. In one embodiment, the programmed system is configured to function as an electronic moderator or emcee during the "meet-and-confer" process. The electronic moderator comprises programmed routines that serve up reports defining issues that have been agreed upon and those that have not been agreed. Points of disagreement are then addressed sequentially (or according to an order selected by the participants) and either worked out by compromise or tentative indicated as points of continuing disagreement with the positions presented by the advocates on both sides of such disagreements being recorded. In alternative arrangements, the system serves up reports as selected by the users or by a designated human moderator such as a third party. The recorded positions of the disagreeing parties can be memorialized as recorded clips from the video conference, or as text entered in verbose or in outline form, or by reference to exhibits that may be presented at the meet-and-confer or previously placed in the database of documentation that will be available according to associated confidentiality provisions.

This process enables the meet-and-confer to function like the closing of a real estate transaction. Both sides have in common certain expectations about the information and documents to be exchanged, before participating in the meet-and-confer session. It is necessary to confer and deal with issues that have not already been agreed. The programmed process provides a framework for attorneys to cooperate by enabling sides to be on the same page on what issues need to be decided, on the implications of deciding one way or another, and to organize and report on the outcome.

The routines made available to the participants at the meet-and-confer preferably contain tools that can be invoked to assist each party with analysis of the proposals in real time and helps them to understand the implications (such as the associated cost) of proposals and compromises that the participant or their opponent might advance for consideration as a compromise to resolve a point of disagreement. Following the meet-and-confer (or following a series of meet-and-confer meetings between which further investigations or consultations are possible), the participants indicate by responses to queries that their current positions are final. The programmed system can then generate a proposed case planning document and report to the court or other tribunal with jurisdiction of the matter (e.g., Form 35 where applicable).

In one embodiment, the routines operated by the litigants or third parties and their counsel are accessed over a data processing network wherein at least part of the operating software and data storage are located at servers that are remote from the terminals used to access the system. For example, the system can comprise a publicly accessed website at a server coupled to memory storing executable routines that govern the operation of the system for multiple users involved in different and normally unrelated litigation matters. In another embodiment, the routines can be operated via servers that are within a party's private data processing network (e.g., LAN or WAN) or via applications running as application at stand-alone terminals having network communications capabilities for exchanging data with a central server or with the corresponding servers, networks or terminals of their opponents. Appropriate data access security routines are employed, with passwords, digital signatures, identity verification, encryption, etc., enabling a centralized system to serve as a web-accessible service for all the necessary functions including establishing an account, initially defining entities and data stores (aspects of which and contents of which are confidential to that party by default), generating reports (some of which may be designated for disclosure to one or more other parties) and participating in the meet-and-confer with the object of generating documentation to be presented to the court. Alternatively, certain routines can run on user terminals and networks.

Roles include Client, Administrator, Attorneys, Custodians, System or Process Owner and Guest user. An administrator user may be designated for the client (Plaintiff, Defendant, and Third-party) who will define the organization structure, configure the survey etc. The Administrator can be designated as an application administrator (full admin. access to client's subsystem) and/or a case administrator (create cases, etc. everything that is case specific; define which users have access to what).

The attorney functions as the legal issues representative of the client, and can use the programmed system for configuring new cases, to create custodians, and to preview and generate reports. The attorney (which title is construed to include the attorney's staff and assistants) provides organizational information, configures users and site\case access\feature access, creates\edits\deletes custodians, customizes surveys and recipients (survey component owners), and initiates system scans, among other activities.

Custodians are users who have or control information about the data required for a particular case. Custodians can be involved in the survey process, answering attorney's questions related to their scope of things that they maintain in the organization, and can assist in system scans.

System or Process Owners are individuals or groups (people) at an organization who have responsibility for, or administer systems, policies and practices. They are involved, for example, in the survey process, answering attorney's questions related to their scope of things that they maintain in the organization. For example, a particular case may involve e-mail and an attorney requests information about e-mail systems within the organization, which request is directed to one or more persons deemed the owner of the e-mail systems. For example, a question in this case could be how the email system is organized. Where are the root folders? What is the IP address of the server? What are the retention/deletion policies? etc. The custodian provides the answers to such questions, which are suitably represented in the database 40 and also reported back to the attorney(s). Clients have Guest User accounts that administrators can enable for full or limited access to various programmed modules of the system.

In some applications, a party such as the defendant in FIG. 3 may be a subscriber having access to all the modules of the programmed system, whereas the opposing party plaintiff might not. In that event, it remains useful for the non-subscribing plaintiff to have limited access in order to facilitate the ability of the subscribing party defendant to exploit the system. Thus when the defendant defines specifications for the case, the specifications are not reported to or approved or mediated with specifications that are defined by the non-subscribing plaintiff. However, the defendant in that event needs a mechanism to allow the non-subscribing plaintiff to see the proposed specifications. For this purpose, defendant creates a guest account for the Plaintiff with limited access or capability, including the ability in this example to access the module to "analyze opposite party specifications." Use of the guest account, thereby supports the ability of subscribing and non-subscribing parties plaintiff can log into the system and see this module, which allows them to agree, disagree or propose alternatives for defendant's specifications. The subscribing party can take advantage of the programmed capabilities even if the other party is not a subscribing user. The guest account can also be used to provide limited capabilities to third parties.

Advantageously, the programmed system is based on a web server and is accessed using a web interface such as browser access to html web pages containing presentations populated by the server with information based on the contents of the database 30. A user or potential user visits the site which is accessible via the Internet and is prompted for a user name and password or is prompted to establish a user name and password. Returning user name and password information is checked against the system in a conventional secured authorization process. Access is provided if the authorization process confirms that the user is a subscribed user or an authorized guest. All users (subscribed users and guests) are only permitted access to the cases and modules for which their account has been authorized. However, a given user such as an attorney may be authorized to access a number of different cases at any given time.

In one embodiment, successful log-in produces a menu with selections that for an attorney or administrator user can include "Manage Enterprise Information." When a user clicks on this menu item, the corresponding programmed module is invoked. The user is presented with the Manage Enterprise Information interface. Through this interface the user can supply the enterprise related information into programmed system. Administrators preferably are able using this module to capture information about various aspects of the organization. Some information can be required and some information optional. Answers to certain questions may invoke further questions in a logical progression or foreclose a line of inquiry. Types of information to be captured advantageously could be based on inquiring:

What is the e-mail infrastructure (which e-mail server is being used etc.)

Organization structure, i.e. information about the organization's subsidiaries, its business units, etc.

IT structure (How is the IT department organized?)

Messaging (How do people communicate within the organization?)

Voice mail (What is the voice mail infrastructure)

Disaster recovery (What is the disaster recovery plan?)

Applications (what are all key applications inside the organization which provide collective data about the systems, processes, people, documents etc.)

Key stake holders

Key positions

Different options may be made available as alternatives to capture information. For example, to capture the general organization level information such as organization subsidiaries, business units inside these subsidiaries, who owns what etc., users can use the "define organization structure" section of the "managing enterprise information" module or alternatively can respond to queries. To capture the Policies and Practices information about the organization, a user can use a default survey template in the survey section (see FIG. 9), modify the default or create a new survey to be sent to key stake holders or custodians. These custodians can fill out this survey, with the information collected into the programmed system.

In general, the Manage Enterprise Information screen has menu choices for defining an organization structure, configuring a survey process, commencing a survey (directing questionnaires to the selected custodians as shown in FIG. 10), reporting on survey status (who has responded and who has not), reviewing and editing the results, reporting survey results and reporting in selected detail on nature of the enterprise.

The "Define Organization Structure" page allows users to maintain the overall organization structure within the system. Initially, the user enters the organization summary in to the system with attributes such as the Name of the Organization, Type of Organization, Business Details, Location Details. In the example shown in FIG. 5, The organization is part of a group having a parent organization and subsidiary organizations (sister firms). This information is captured in the database and reported. Depending on the position of the party in the structure, it may be desirable in composing the survey and in proposing specifications to extend the scope of inquiry to the other related entities.

The same concept applies to identifying departments under an operating group and identifying owners (points of contact) at different levels. These can be encoded by entering a department name, department summary, department owner and the like. The result is a logical structure that can be reported graphically as in FIG. 6 or offered for an attorney of other user to browse in text format, to search for names or titles or other strings, etc.

A "Configure Survey" process is designed to facilitate the attorneys understanding of the organizations' facilities and software applications. Examples are servers, e-mails systems, LAN and WAN arrangements, data storage locations/paths, archive and backup devices and processes, fixed and mobile terminals having access to the applications or data store, etc. A description of the system, processes, data and where the systems are located to provide information within the organization, enables configuration of a survey (pointed questionnaires) that encompass the likely sources of responsive information.

Through the survey process user, a user such as an attorney or administrator can create a question/answer template that queries for information about the organization's applications and data, etc., and the answers of which are stored in the database to define these aspects. In one embodiment, predefined or canned survey templates are provided for particular targeted data. For example, a prepared survey of questions can be directed to custodians of email information and another prepared survey to the document management custodian or to the custodian of accounting records. Preferably, users such as attorneys or administrators can modify and customize survey templates and store them for subsequent use in the same or a different case. A user likewise can choose to compose a new survey template from scratch when desired or when necessary to inquire about a subject that may be peculiar to the enterprise. The survey process, schematically shown in FIG. 7, serves to educate people involved with legal activities, about the organizations IT infrastructure and how IT supports various business departments within the organization.

An example of a canned survey for identifying the email application used in an organization might query for the name of the email application program, the IP address of the server that hosts the email server, the server name, physical location, business groups supported, version of the software, root folders of the email server (e.g., the root folders of an Exchange server, an identification of any previous system or archive, dates of establishment, the name of the IT person most knowledgeable about the system and so on.

Custodians to whom surveys are directed enter their responsive information into the system and submit the survey to the attorneys. The attorneys review the results as compiled from the responses of the custodians who replied. The survey answers can be documented in the database and exported, for example, to Excel spread sheets for later reference.

An attorney or administrator begins by selecting a "creating a new survey" function, or can begin from a predefined or default survey template. The template is modified and stored in the database information used to define the nature of the particular party, typically the attorney's client or the administrator's employer. However a user of the system can also use this function to define the nature of their opponent, using the information that is available. Through this survey, attorneys and administrators gather information about a party's policy and the practices that they follow in their day to day activities. Typically the party is a business entity but the same manner of defining the party's activities, their data stores and categories of information, is also useful for non-business entities and individual persons.

According to one embodiment, attorneys complete the survey template to the extent that they can and forward the survey with a request to complete missing entries to key stakeholders inside the company. In another embodiment, the programmed processor is arranged with an interactive set of questions that is sent by email to the stakeholders with a request to answer the survey questions. Some questions with yes or no answers can define the later sequences of questions to be asked. Other questions are answered by giving numbers or selecting ranges of numbers, by answering with a letter string identifying a name or phrase, etc. The survey gathers information defining the organization's systems, how its information technology system is organized, what are all policies and practices being followed by the organization for document retention and keeping backup copies, etc.

The survey may be forwarded to one person or to many persons. The responses of plural persons can be compiled into the system database defining the party's information stores. Inconsistent replies by two or more persons to similar questions can be flagged for investigation. A status report is available, allowing the operator (the attorney) to see the progress of any survey initiated in previous steps, such as which persons have replied, the extent to which a person has progressed when the survey answers are being collected, etc. To some extent, the answers of survey participants are simply recorded. Some answers lead to other questions. Some answers define the nature and the scope of data stores that might need to be searched for answers to interrogatories or documents and data files responsive to discovery requests.

It is advantageous to direct survey inquiries to managers and employees that are knowledgeable about an occurrence or relationship, etc., or custodians who have knowledge or control of data sources. For example a survey to a custodian might inquire as to:

retention and backup practices followed by the custodian
    details as to the computer used at work (IP Address, configuration etc.)
    details as to the computer used at home (whether it contains company data such as documents or emails; whether it has been connected through a VPN)
use of external media
Instances of email sent to others and related to the case
Practices for keeping email
Security practices for using, changing and protecting passwords
Company and personal practices when keeping or sending information, note taking, use of instant messages, archives In one embodiment, conducting the survey involves the attorney setting up the questions and identifying custodians or potential custodians to whom questions are directed. The programmed processor can robotically distribute the questions and collect the answers. Insofar and the answers from one surveyed person may identify another potential custodian, the system can direct the same survey or a different stored survey to the identified other potential custodian, thereby efficiently polling for information without a great deal of specific attention.

Attorneys who are not provided a capability to modify information provided by the custodians in response to answers, may choose to append additional information or perhaps to indicate that particular information is sensitive and is not to be disclosed to an opponent. Additionally, attorneys can choose to organize the survey results in a way they deem appropriate or logical. Any missing answers can be filled with tentatively assumed or default entries marked as such.

The survey results when compiled and massaged enable generation of a report that can be displayed in summary or detail form, printed or perused by interactive selections, such as searching for strings, field titles, XML tags or the like. Thus, a person accessing the enterprise summary information compiled from the survey results might want to identify the e-mail administrator in the organization or the location of backup tapes or media, which can be accomplished by searching the database for those terms.

In addition to collecting information respecting the organization (typically the attorney's client) and optionally collecting available information on an opponent's organization, the system is programmed to establish case information that is used not only in managing discovery and reporting negotiation of a discovery plan, but also generally to provide reference information from which persons can be identified and contacted. This information, similar to a court docket system, contains the court identification, assigned judges and magistrates, the exact caption and docket number, party names and their status as plaintiff or claimant, defendant, counter-claimant, third party defendant, intervener, the cause of action, etc. The cause of action and party identifications can affect the overall case specification and the later steps taken in defining proposed or default discovery plans and the like.

Some case attributes that can be maintained involve geography, such as the locations of offices, custodians, evidentiary items, witnesses and the like. Entities involved may include persons and business entities. Business entities or operating units of businesses may be related or distinguished according to corporate structure, relationships such as insurer/insured, guarantor or indemnifier, licensor/licensee. Employee levels in management or as officers/directors and their relationship to other employees are advantageously encoded. Matters of times and dates are preferably recorded for reference, including historic dates such as the dates of relevant occurrences, procedural dates such as the date of commencement of the suit, and prospective dates such as deadlines according to case management orders and the anticipated date of the meet-and-confer. Subject matter categories can be recorded such as key elements of the cause of action or defense. Ranges of dates can be recorded, for example as affected by any statute of limitations that might help to define the earliest relevant date for evidence. It is not mandatory that all these fields be included or populated, but it is useful to have the fields available in the event they are needed. Conversely, the attorney or administrator managing the case may determine that too much information is cluttering the database and limit the information that is presented in reports and the like to those fields considered important.

The questionnaire is directed to managers and to potential custodians and is targeted to the subject matter of the legal proceeding, such as allegations in the complaint, counter-claims, affirmative defenses and third party claims. The questionnaire preferably comprises interactive questions and answers directed to and from representatives of the party represented by the attorney or manager, such as company managers. The questionnaire causes the database to be populated with information associating persons with sources of information. These are persons who are knowledgeable about the party's business and either able to answer questions from firsthand knowledge or able to suggest where one might look to find answers. The persons who are identified typically include those responsible for maintaining document and communication systems that may store documents, memoranda, email messages, billing and accounting and employment information. Furthermore, the questionnaire can seek to identify persons who may be associated with the subject matter of the litigation.

The document management systems, databases, email message systems and the specifications and archives thereof that are associated with persons associated directly with the subject matter of the litigation are identified, as well as persons less directly involved. Those less directly involved may be coworkers in a business operation, managers, subordinates, persons who service that business operation such as human resources managers, facilities managers and others. Preferably using questionnaires that include default questions, questions composed by the attorney based on the nature of the legal action, and follow-up questions that arise from the initial answers of potential custodians, an organized record is produced that details the data custodians, their data sources, identification of potential witnesses, the location and status of articles that may be of evidentiary value.

In a further phase of data collection, the programmed database can collect information from within the data stores identified by the custodians, namely to make quantitative and qualitative determinations about the contents of the data stores. Quantitative measurements might include the byte size of an email or document management system, potentially within date ranges. Qualitative measurements can be the number of occurrences of words or phrases or other search criteria, obtained by processing the information in the data stores to develop reports. Examples include an index of all terms in an email account or in a document set, a analysis of the count or frequency of the appearance of terms, etc. Processing to obtain such measurements can be limited to data associated with a given person, e.g., authored by the person or to which the person had access. Conversely, the processing can analyze for terms and produce the identities of persons who are associated in these and other ways. The processing can include running queries, especially based on the text found in interrogatories and requests to produce, to help to estimate, before undertaking other considerations such as privilege and confidentiality, the number of hits that might be expected.

There are available data mining programs that purport to generate intelligent queries using not only strings found in the interrogatories and requests but also synonyms, related terms and the like. Such data collection and mining programs can be procedures called in conjunction with the programmed system of this disclosure, or can be included as functional elements of the system. Such collection and mining programs are available, for example, from Clearwell Systems, Inc., E-Discovery Tools, and others, and can be used or emulated to collect metadata, index documents, find relevant information in applications software such as email systems, document managers for word processing, spreadsheets and databases, contact relationship managers, etc.

According to the foregoing techniques, a record is established as represented in the database, to define the case and to list tentative identifications of potential witnesses and custodians of evidence, and descriptions of the sources of evidence that witnesses or custodians might be capable of producing; the descriptions including the nature, quantity and location of electronic and/or paper or other data stores and sources of information. In the case of electronically stored information, the descriptions can include information including the native format of the data, and processed summaries such as indexes and the results queries using sample selection criteria.

The collected information enables the system to produce time constraint, manpower requirements, and out-of pocket expense reports descriptions based on the measurements and description of the data stores and sources. By way of nonlimiting example, if the descriptions define a subset of paper files or document image files associated with a particular business activity or particular persons, and the number of pages is discernable as well as the costs of photocopying and applying Bates number identifications, the system readily can calculate the cost of producing copies of those documents. The alternative might be to allow the files to be searched in paper form by counsel for the party promulgating discovery requests. Further applying time constraints, one can determine the cost of producing the documents according to an expedited schedule versus a more leisurely and less expensive pace. Assuming that the documents are maintained as images or are copied into image files such as pdf images, one can calculate the computer processing time and effort that would be associated with optical character recognition to produce text searchable versions, and further to index or analyze the text searchable versions according to selection criteria. And the selection criteria used may inherently be broad or narrow. Accordingly, the programmed processor can run reports from information in the database defining alternative specifications (tentative plans) as to whether the documents or information are to be produced more or less comprehensively and in a form that is more or less pre-processed. The processor likewise factors in the respective time and cost constraints of these alternative specifications, and produces a listing describing the different alternative specifications and their respective costs and time schedules.

The system also can determine other particulars about the data, such as a count or perhaps an identification of documents that might be subject to claims of privilege because certain names or subject matter can be found by querying the content or names in the addresses (including CC and BCC names). The system also can provide estimates of costs and time constraints that are not directly related to the data sources, such as travel expenses that could be incurred in meeting a witness or custodian for conducting or defending depositions.

Attorneys promulgating discovery are inclined to present very broad questions in interrogatories and to demand far reaching document productions, which can be expensive and at some point are overbroad, overly burdensome and not reasonably apt to lead to discoverable evidence. Attorneys defending against such discovery are inclined to object liberally and to be reticent with answers. It is typical in litigation for adverse parties both to present expansive discovery demands to their opponents and to object to and defend against their opponents' demands at the same time.

It is an aspect of this disclosure that the information about the organization structure, collected as described above through the manage enterprise and case scoping steps, are made available and at the fingertips of the attorney or other operator of the programmed system, so that alternatives can be tested during a phase of negotiation between a party and their opponent. The definition and defined scope of the case (such as selection of more or less intrusive search alternatives), and the identification of persons such as who are all custodians and case attribute, as well as the calculations of data volume, format, cost, etc., are all variables that may be made more or less extensive by agreement between the parties. This negotiation may result in a give-and-take that enables a party to stand firm on demands that are important to its cause of action or defense, and perhaps to give in on certain of their opponent's demand. The present disclosure provides the means by which the party and its attorneys can consider the implications of the alternatives on the manpower and expense that they must commit. The parties can use the information produced by the programmed system to justify their advocacy for particular discovery plan terms. For example, an unduly large or disproportionate effort or expense required of one party can be argued as grounds for a plan to be rejected. If it can be shown that the effort or expense of an alternative specification is minimal and the results will be helpful to resolve issues, that can be argued as grounds for a plan to be adopted. In the best possibly scenario, the end result is fully negotiated discovery plan. However, in a less cooperative scenario, some point needed for a discovery plan perhaps cannot be negotiated. In that event, the programmed system can provide a report that details the points that were agreed upon versus the point remaining in dispute, the alternatives that are advocated by the respective parties, and compares the costs and time constraints of the alternatives.

The disclosed system is useful for a single party to analyze its options. In that case, the party can choose to disclose selected information to its opponent and not other information. In another embodiment a single party using the system can input estimations respecting the custodians and information stores of its opponent and use the estimates to generate cost benefit comparisons of alternative specifications. In a full service embodiment, both adverse parties enter their own information into the programmed system. The programmed system protects the information of each party from disclosure to the other party; however the system compares the projected costs for both parties according to the alternative specifications. The parties might use equal cost-assessment assumptions entered into the system by agreement (such as per page costs), or can flag a situation in which different assumptions are being used so that the parties can resolve differences.

The availability of good information on one's own situation, and either assumptions or preferably equally good information on one's opponent's situation, wherein the information is generated by a programmed system as discussed, tends to reduce gamesmanship associated with negotiating discovery plans. A negotiated discovery plan may result. If all the necessary terms cannot be resolved and the parties continue to disagree on one or more points, the programmed system enables the attorneys to prepare for meet-and-confer sessions with the other party, required before seeking supervision from the court by way of a motion to compel or its counterpart, a motion for protective order. The attorneys define their positions on specification categories and specific terms, points of disagreement are regarded as agenda items for the meet-and-confer session. The tools provided by the programmed system are useful for both of the parties to understand the discovery items, to analyze budget projections and the like, and to make informed decisions.

In one embodiment, the meet-and-confer operation is invoked as a processing step after having defined the organization (the people) and scoped the claims, counterclaims, defenses and relevant factual points to be established (the evidence or potential evidence). In connection with e-discovery, for example, the meet-and-confer process commences when a party selects "Propose E-Discovery Specifications" on a workstation logged into a server or local workstation operating this facility. See FIGS. 11 and 12. The party can choose to analyze and propose a set of specifications for its own part or to analyze the opposing parties' proposed specifications (assuming both parties are participating). The party also can choose a mediation management process amounting to a computer-aided meet-and-confer session that is organized to present choices as agenda items, record respective agreement or disagreement and statements that the parties may care to advance, and to generate a report that optionally can be presented to the court or at least provide information in connection with filing and arguing a motion for a protective order or a motion to compel. Alternatively, a designated human can serve as moderator.

In the "Proposed E-Discovery Specifications" section, attorneys define the information that might be made available, how much of it is to be available, the format to be required, etc. What is to be regarded as discoverable can be limited in terms of time, content, volume, format and other particulars. The information defining available information may be sensitive and is captured for each case in an isolated mode, i.e., made available to the user through text reports when so authorized. Basically, through these specifications, attorneys define the rules set for what will be presented, how information will be gathered, how information will be presented and for how much specified time the information will be persisted and presented.

In an advantageous arrangement, the process of defining a proposed specification is broken down into specification categories. The categories have definitions that can be displayed to indicate the kind of information involved, how it might be handled, and implications of one choice over another. An exemplary list includes timeframes and deadlines, custodian identifications, a scope of relevant ESI and associated systems/data. A preservation scope can be defined, together with data collection processes, data processing specifications for how collected data is handled, search methodologies, produced data format, plans for handling privilege issues and waivers and so forth. Costs can borne separately or shared. Specific types of ESI can be deemed admissible or not. Insofar as different rules may apply to local jurisdictions where testimony or other activities are undertaken, the differences can be adjusted by agreement or recognized to apply.

The specifications can be composed from scratch, i.e., creating a new specification by advancing through the categories one after another and being prompted for selections. Alternatively, parts of an existing specification can be adopted and revised. The existing specification can be a default specification, a canned specification associated with the type of cause of action, or a previous specification established by the party in a different case but encompassing information about data sources.

The programmed system allows both of parties to define their proposed specifications and positions on their opponents proposal. The system allows the parties to agree on one or more points, to disagree, and to propose different specifications for themselves or their opponent. Initial steps in proposing a specification or commenting on the opponent's specification need not be conducted contemporaneously or in person. After both parties have had an opportunity to complete this section, those specification categories wherein any of the parties disagree with any other party during the matching process become the agenda items for the meet-and-confer session in which the parties will negotiate further and possibly reach an agreement before seeking the supervision of the court.

The specifications can be more or less detailed, but preferably encompass all the points on which parties and their attorneys typically disagree. Additional points can be added as appropriate at the request of any party. For example, time frames are sometimes at issue. A party requesting discovery may request documents composed or accessed from the beginning of time to the time of the request. The party receiving the request may point out that such a time frame is overbroad for some reason, e.g., it exceeds an applicable limitations statute or is beyond the term of employment of an implicated custodian, etc. In this case, the system can prompt users to set timeframes separately for plaintiff, defendant, or third party. Time frames can be set distinctly as to overall range, by custodian, by data source, by subject matter, by location, by organizational structure, by case issue, by entity, etc.

The setting of alternative specifications is facilitated by information previously entered to define the organization and to scope the matter at issue. This results in some of the specification having practical limits. For example, if the organization defining steps including identifying employees as custodians and the data includes the date hired, the system can default to a start time that is equal to the hire date. Parties are permitted to add additional custodians for the plaintiff, defendant or third party as the process progresses.

Custodians in different job functions may have different involvement with electronic stored information (ESI). For example, all employees may have access to email but only accounting department and information services employee may have access to financial accounting databases. Some employees may use different sorts of workstations than others. Some may use more than one workstation. These relationships can be offered if available and made part of the specification or not. In order to associate a user with data content, it is possible to associate a user, for example, with:

Email
  Server
  Network
    Local Computer
    Laptop
    Desktop
    Home Desktop
    Home Laptop
  Third Party (Yahoo, AOL)—stored on computer
  Third Party (Yahoo, AOL)—stored online
  E-mail Archive
  Bloomberg
  Collaboration tool mail (eRoom, SharePoint, etc)
  Blackberry
  PDA
Text Messages
  Blackberry
  Cell Phone
Instant Messages
  Server
  Network
    Local Computer
    Laptop
    Desktop
    Home Desktop
    Home Laptop
  Third Party (Yahoo, AOL)—stored on computer
  Third Party (Yahoo, AOL)—stored online
  Archive
  Bloomberg
Electronic Files
  Server
  Network
    Personal Share
    Group Share
    Department Share
  Local Computer
  Archive Platforms
  Document Management Systems (Documentem, Zantaz)
  Databases
  Collaborative Platforms (SharePoint, eRoom, etc)
  PDA
  Blackberry
Databases
  Server
  Network
  Local Computer
    Laptop
    Desktop
    Home Desktop
    Home Laptop
  Third Party—stored online
Application Data
  Infrastructure
  Accounting
  Operations
  Logistics The specification preferably associates hardware and software systems used by custodians, to the relevant ESI identified in the previous section. Preferably, the programmed processor is configured to display a list of the identified relevant ESI sources. Users can determine more information about what an ESI is by selecting the title, whereupon a definition with details can be displayed.

The definitions associated with ESI can include different levels of detail. In addition to reporting, for example, the existence of an email account, for example in Microsoft Outlook or Lotus Notes, there are various network and user level selections that are made and may be highly relevant to discovery issues. Numerous options are in place, for example scheduling of backups and archiving, possible forwarding of messages among users, settings for privacy or encryption and the like. At least a subset of these settings and options are preferably investigated and made part of the information presented to users for composing an appropriate ESI part of the discovery specification.

Document manager aspects may be used for non-email documents or integrated with an email system. These aspects may include the automatic generation and storage of certain metadata, automatic indexing, backups, security provisions, workflow and collaboration settings, limits on rights to revise, copy or append, version control, collected history of user access events, etc. Preferably, the programmed system includes facilities to report on settings, and to report on contents of metadata, document indices and similar collected information, especially insofar as the information affects the intrusiveness, volume and cost of responding to discovery in one or another of plural alternative ways.

According to the programmed process, users are prompted to select importation of data from a systems/data information data store populated from an automatic process for analyzing a party's ESI systems. Alternatively, in the absence of an automated process, the user can enter such information as is known about the systems that are to be reported upon. When estimating costs of alternative specifications, these systems can be searched at a later point for responses to criteria and over date and subject matter ranges that are agreed upon during the negotiations, or the meet-and-confer or ultimately by order of the tribunal. The system generates a report which lists the relevant ESI sources associated with the specific systems/data types they apply to. The report can be viewed in table/list form or as a graphic with text (example—picture of e-mail labeled as e-mail with specific system information inside the graphic.

If data is not found to exist according to a category (for example it may be unknown whether a custodian logs into the employer's systems from a laptop), the user is prompted to answer survey questions. Other relevant sources can be surveyed, such as information technologies personnel who may have access logs. Either or both the user/custodian and other personnel may be asked to identify questions that remain to be answered. Once the survey has been completed, the system generates a report which lists the relevant ESI sources associated with the specific systems/data types that they apply to. The report can be viewed in table/list form or as a graphic with text (example—picture of email labeled as email with specific system information inside graphic.

A specification with full detail is made available to the attorneys and other representatives of the party to whom the specification applies, but not to representatives of the party's opponents. The opponents preferably use the same sort of system to develop data on their own systems, which is kept confidential for their own use. It is only if a party is challenged to justify its position as to what level of discovery is appropriate, that a party may choose to reveal selected information as a way to back up their protests with information why a requested level of discovery is overly onerous or expensive.

ESI considerations may require collection of additional information, either automatically or by prompted answer to interactive survey questioning. To assess document preservation compliance, a party may be required to specify document date(s) of litigation hold, methods of communication with users/custodians (system, manual, e-mail, other) and the method of their acknowledgment. The recipients of the litigation hold order are detailed (custodians, organizations, entities, third parties) and the date range and scope of litigation hold for issue types, subjects, custodians, organizations, entities, locations, and data source (or possibly applying to the overall range available) are selected and can be reported. Alternatively, the results of these selections, stored in the database, are used as variables from which other values are calculated. For each litigation hold, a scope is defined as to data sources, custodians, locations, business units, entities, issues, and subject types.

Through the preservation scope functions, attorneys can specify initially the information that the party must save (not delete or destroy or move to archive) pursuant to the specific litigation matter. Date ranges for the preservation scope may differ from the time frames or date ranges defined in time frames section for available data. Typically the preservation scope applies from the time of commencement of a lawsuit to past times at or preceding the time of some event. Preservation orders can be distributed direct from the programmed system to the custodians and affected users. The text of the orders to preserve, and the time/date of receipt and acknowledgement of receipt may be pertinent to later testing for compliance and disproving spoliation. The data ranges preserved and the range of dates on available data files may be shared or presented in the "Analysis of Other Party Positions" module to the other parties' attorneys.

The present system can comprise a data collection module or the present system can be integrated with a commercial module tasked with selecting data content according to criteria and optionally processing the selected data content. The automation of data collection is exemplified by robotic analysis of ESI content, but similar concepts apply in the case of paper files that are rendered into ESI as images and optionally processed as text searchable images with OCR metadata. In any event, the attorneys use the data collection function to specify rules that will apply to data collection. The rules may specify the extent of data to be collected from a particular party or custodian or account. For example, collection may entail copying or otherwise processing all the data available in an account, of may entail copying only those files or pages that are found to contain data meeting some targeting criterion, such as the presence of a name or combination of words.

The purpose of this part of the specification is for the attorney (or administrator) to select among data collection methods to be applied to each data source maintained by that attorney's client or administrator's employer. Information generated by analysis of one's own party's data is more extensive than the information that one might offer to the opposing party. For the opposing party, the attorney might reveal only the relevant ESI category. Additional information defining the scope of information that is to be searched and/or the quantity of information that is estimated to be produced according to one alternative specification or another, are available to be used in advocating one specification over another, but are not offered to an opponent unless needed to support an estimate of cost/benefit or to rebut the opponent's estimate.

Collection of data can be by obtaining a ghost image, an X copy, a database backup, an extract, a segment containing targeted data, etc. Collection methods can include compression (zip) and copy (winZip, winRar, 7zip etc.), collection and preservation of the original Metadata (rendering it read-only), generation of summaries or abstracts, etc. After choosing the targeted data option and collection methods, that attorney or operator defines the scope limitations for the data sources. The scope limitations are exemplified by selection of dates, file types, custodians, records, locations, subjects, issues, entities, organizations, etc.

According to an advantageous aspect, the attorneys for each of the opposing parties is provided with the capability to fully understand their own party's information. The opponent's systems are less completely understood if at all. With a knowledge of their own party's ESI and other data parameters, the party's counsel proposes the options that counsel would like to apply to their adversary. There is some degree of restraint inherent in this process, because if counsel who asks for very onerous specifications to be applied to their adversary may find it difficult to advocate that a substantially less onerous specification should apply to counsel's own party.

In an example, an attorney might select the full data option, and create a ghost image of the system from which they are collecting data. If the attorney selected the targeted data option, a selection could be limited to certain file types to be collected from the system or files containing selected strings. There are tradeoffs in these choices. For example collecting a ghost image may contain a comprehensive collection of information but much of it is irrelevant and the receiving party needs to discriminate the relevant information from the irrelevant. Selections limited to file types are less extensive (e.g., word processing documents, spreadsheets, etc.) but may leave something relevant undiscovered. Selections including additional limitations of dates and content further concentrate relevant information at greater risk of missing information that might be useful.

While defining specifications, attorneys propose rules/specifications to be presented to the other parties' attorneys as tentative selection criteria. The actual data collection will happen at a later stage. The presenting attorney typically presents tentative selection criteria without having information sufficient to estimate the quantity of data that will result from the proposed specification, the processing time, manpower and the like that might be involved. The party receiving an opponent's proposed specification preferably can test the application of the specification to the data as defined in the database and estimate the extent of data that might result, and how much manpower and data processing time and capacity would be needed.

Data processing steps can be built into the specifications, namely made part of the rules defining the nature and state of information that will be presented, after steps in the data collection process, limit the data collected and optionally process and/or tag the data collected. For example, attorneys may choose to collect the full data including systems files, dll's etc. but only to process .doc word processing files out of the data for selection by strings.

In one example, the user is prompted to select files for general or specific processing steps. Selections can be to include or exclude, for example using file extension, category, file name, tree, subdirectory or other aspects. Examples of steps to be included can be searching of content or associated metadata for strings or combinations of strings, indexing, marking or appending attribute information, searching/excluding duplicates or other steps. Some categories can be recognized and are known to have particular characteristics that make the files apt for processing in one way or another that is distinct from the appropriate processing of other files. For example and without limitation, Microsoft Office data files and macros may be recognized and treated differently from Lotus or Corel files having similar functions, email files may be analyzed for text and for attachments, duplicates of emails and other messages can be removed and copies of multiple recipients can be noted rather than saved, compressed files for archiving or backup may be decompressed as an additional step. Additionally, files can be passed over deliberately, such as temporary download files, browser cookies, antivirus definitions, etc. Advantageously, all inclusion and exclusion criteria and process directions are logged.

In one embodiment, alternative processes can be specified for use as search methodologies. The search capability of targeted computer systems can be employed for all or part of the search process, e.g., using Windows search (including noting the Windows version), other search software such GSA (Google search appliance), etc. Different software or operating systems may produce results that differ and in order to enable complete analysis, the selections made and methods used are logged for reporting or future reference.

Having analyzed, processed, searched and possibly selected documents that will be produced as a data set or filtered to produce a limited set, or simply counted, it will be necessary to generate an output as a set of reports and/or copies of selected documentation. Accordingly, user selected specifications are advantageously provided for the selection of report and data output. A database can be generated according to user specified criteria about whether to populate all or a subset of possible metadata fields such as author ID, title, create or last modify date, etc. Enhanced metadata can be generated, including for example, subdirectory location, search criteria forming basis of selection, etc.

Some or all of a set of identified textual documents can be specified to be reflected by a Concordance or Summation or Ringtail or Index. Copies of text can be specified for storage in flat or format-encoded form with or without immediately associated metadata (e.g., appended to the file content), with or without Bates numbering, labeling for confidentiality or implication on grounds of attorney client privilege or work product. Image and other data can be converted to be stored consistently in one format such as pdf with or without OCR results, tiff single page or multipage. The specification can require instead or in addition that the data be made available in the native format in which it was found. In each case, the user populating the specification is prompted to select production formats and alternatives, for example from a menu list. If the user has a question about a format, a definition or explanation or prompted suggestion can be presented, for example in response to a mouse right-click or the like.

The foregoing details present options for specifications. The party having control of their own data sources and custodians preferable generates one or several alternative specifications. The specifications can actually be executed to pull and process from the data sources all the associated materials and information. Alternatively, the specifications can be tentatively applied to the data sources and custodians in order to assess the volume of the output they would generate, the processing time requested, the number of bytes or sheets or other measures of output likely to result, and generally to enable a cost/benefit assessment wherein the intrusiveness and processing time are costs and the benefits are characterized by the output that would result. Having developed a potentially extensive analysis of the party's own data sources in this way, an opportunity is provided for participating parties to barter with one another as to the specific specifications that will apply. This step requires the parties to analyze their opposing party's specifications. If both opposing parties are participants in the system, the parties' alternative specifications and their offers can be compared directly as being generated in the same way. If only one party participates and has developed a specification, that party has an advantage over a nonparticipating party whose specifications and results are a matter of guess work. Nevertheless, the system will allow a more cursory and probability-based specification from a nonparticipating party to be compared with the programmed one of the participating party for carrying on the negotiations leading to an agreed discovery plan.

In the further description, an embodiment is described wherein both opposing parties are participated and both have exercised the system sufficiently to test alternative specifications and to specify a specification to which they might agree. These can include specifications that have the same attributes for both parties, or the attributes can differ such that parties in different circumstances could agree to produce their documents in different formats, for example, or using different specifics of processing. The system has collected specifications from both the parties, and allows both parties to agree, disagree and to offer and accept compromises for the specifications they have defined. Specification categories where any of the parties disagree are noted and become part of a meet-and-confer agenda. The parties are permitted to create new categories for particular situations, in addition to categories previously identified or available as defaults. After a period of negotiations, some or all points are decided by agreement, or remain at odds. The result can be used to populate a Form 35 submission to the court. Alternatively, information is developed to facilitate a motion to compel or motion for protective order.

Although two (or more) participating parties can define and analyze specifications from the system, it may occur that one of two parties negotiating with one another may not be using the system, such as a plaintiff or defendant. The participating party preferably can provide email or other messages, URL links to an interface for a limited guest account or the like to enable the nonparticipating party to view proposed specifications or parts thereof from the participating party. The nonparticipant is permitted to accept, reject, or comment on specifications, such as to object or to propose workarounds. The party who is participating using the system can also permit their opponent to propose specification positions and to make representations about the data sources in their custody (although these are generally likely to be less credible than the specifications and reported attributes of the participating party). In this way, the system can manage negotiation and meet-and-confer activities whether one or both of opposing parties participate.

The system separates out the entries for specification categories on which opposed parties agree and disagree. The system also records items that are incomplete, for example because one or both parties have not indicated agreement or disagreement. The user can choose a particular status category to view, such as items by status (agreed, disagreed, incomplete) or can examine the proposals and counterproposals of the parties as to the specification categories.

The user selects to confirm all or to confirm or edit each specification attribute. If edited, status is changed to disagree (revised). If confirmed, the system stores a digital signature with the date, for an agreed upon an item. For disagreed items, the user can chose to agree with the adversary, offer a compromise, or to mark the category as a meet-and-confer agenda item. If a compromise option is selected, the user can edit the particular specification, and a notice is sent to the adversary after user agrees. It is possible to regard each agreed item as permanently resolved and no longer subject to discussion. Alternatively, in view of the give and take of negotiations, a party may be permitted to retract its agreement to a particular specification attribute in consideration of some other change that has been made in the other specification attributes. This process of negotiation continues until a list is generated in which the parties have agreed items and disagreed or no-answer/incomplete items. The disagreed or no-answer/incomplete items are regarded as agenda items for a final negotiation session before seeking supervision from the court, namely at the meet-and-confer at which both parties and/or their counsel sit down and try to resolve points of disagreement.

According to applicable rules of procedure, counsel for both the parties, information custodians knowledgeable about the parties' data scenarios, key stake holders with the authority to make decisions, system/process owners and others who may be geographically distant may be required to meet in order to have a meaningful meet-and-confer session. However the present system facilitates communications that bring together the necessary information and the empowered decision makers in an automated meet-and-confer that preferably includes video conferencing and for participating parties, data available at a keystroke to assist in advocating their positions. When invoking the automated meet-and-confer function of the system, the issues are presented as a discussion agenda in an organized manner with an advantageously high probability of agreement, and/or with documentation of disagreement and the reasons given therefor.

In an exemplary embodiment, an entry html page allows users at this stage to join a meet-and-confer conference, to view\edit agenda, and to set certain meet-and-confer options such as voice recording, video or voice-to-text transcripts. Initiating the conference commences a record and optionally invokes a robotic moderator function of the system, or at least offers lists and information. See FIG. 13. Users can view the record of negotiated items and open items, select to view conference participants, etc. The moderator function prompts the users to address the open agenda items, records changes and finally composes a report that can be presented to the court.

In one embodiment, the conference can comprise a screen sharing session based in part on available multi-user software interfaces such as Cisco Webex, Microsoft Netmeeting, Citrix GotoMeeting, Flash Media Server or the like. The meeting can have multiple participants from either or both sides. The organizer of the meeting sends an invitation e-mail to one or more other participants containing a URL for initiating a browser session that engages with the multi-user conference interface. In one embodiment, the arrangement includes audio and video enabling the participants to see and hear other participants. Participants are thereby enabled to view and to offer documents such as reports generated by the system to backup the participants' advocacy of details for the specification that will be applicable to themselves or their opponents or both. The discussion facilitates joint participation and supports progress toward resolving open issues. The system records the results of agreement on the respective issues, or can record the fact that a point at issue has reached an impasse. In the event of an impasse, the system stores and can append to the report the submissions of the parties in support of their arguments for a given specification aspect and against some aspect advocated by their opponent.

The meet-and-confer session carries an inherent incentive for the parties to be reasonable and to seek appropriate compromises. At the end of the meet-and-confer session, a final report that can be presented to the court provides information respecting disputed as well as undisputed points. If a party has not been reasonable in the negotiation, that fact may be apparent to the court when reviewing the parties' positions on the specification applicable to themselves and their opponents. The report can also include additional details and information identifying and prioritizing custodians, defining the nature of discovery obligations on which agreement was reached, as well as the parties' positions on disputed items. At least this information is made available to parties and participants. In one arrangement, the system generates a written report formatted as a Form-35 report to the court. In other situations, information may be useful support for a motion to compel or a motion for a protective order arising from the discovery process.

In a preferred arrangement, the programmed system can function as an automaton-mediator, actively managing the meet-and-confer process to satisfy Rule 26(f) of the Federal Rules (or equivalent rule). The system employs a database of discovery process preferences. The discovery process preferences comprise selection criteria, methods, and processes, forming a specification for how a particular aspect of discovery will be performed. Discovery process preferences are stated or proposed for each party to the litigation, and then compared and evaluated and hopefully agreed upon. The system provides a workflow and database for analyzing and ultimately selecting those elements of the preferences that will determine how the discovery process will be handled going forward.

The database includes preferences selected in response to a workflow designed to elicit key factors that are negotiated as part of the discovery process. The system electronically compares the preferences of adverse parties and identifies the points of agreement, the points of disagreement and areas that are incomplete (e.g., remain to be negotiated). The system serves to the parties an agenda for a meet-and-confer conference, to address areas of disagreement or areas that are not complete.

In one embodiment, the system supports a web based, audio, video and textural virtual collaborative meeting space. The virtual meeting space comprises streaming video and audio conferencing with chat capabilities, a textual window which presents the electronic moderator (defined as a computerized meeting facilitator or automaton that prompts for topics at hand to be considered by the parties). The electronic moderator offers a current discovery topic or list of topics, the stated positions of the parties on these topics, if any, action buttons and supporting tools that allow conferencing in these areas. The electronic moderator and tele-conferencing provide a vehicle to make agreements and subsequently generate a report for the court (such as a Form 35 where applicable).

The system electronically moderates the meet-and-confer conference based on an agenda, namely key discovery topics (and especially e-discovery topics) where the parties' preferences are not in agreement or are incomplete, meeting the requirements of applicable rules. The agenda is in part the result of a process of comparing the parties' discovery preferences. The system defines and stores key areas of importance that affect the discovery process. These areas, without limitation, can comprise available processes, methods, options, limitations, data types and technologies, which can be selectively employed to address the key areas. Preferably, the areas have associated definitions and explanations of each component and option, so that the implications of making selections are readily apparent to the participating parties.

A textual and preferably also graphical process or workflow guides the user though the key discovery areas' available options and provides information and methods to ultimately select preferences. As one result of the process, the system stores the specification preferences associated with the party and the matter. In one example, the system sets up and proposes or posits multiple scenarios containing variations in the preferences that might potentially be chosen for a given matter. Reports are available to detail the implications of various choices, whereby the users/parties can analyze their options, and make decisions based on what is most important to them. Different choices will entail differences in expense, manpower, intrusiveness, risk, benefit, etc. Furthermore, in a preferred arrangement wherein adverse parties in discovery have full access to the system, the parties have the option to offer and accept tradeoffs with one another.

In part, the present disclosure concerns establishing a plan at the outset of discovery to guide the discovery process. However the system is also useful in several ways during discovery. If a dispute should arise between the parties, the system can propose or posit compromise solutions and possibly alternative solutions, and provide an analysis of their costs and benefits as described. Additionally, in the absence of a dispute, the preliminary analyses accomplished by the system, such as identifying and indexing documents responsive to selection criteria, are useful in actually accomplishing the answers to discovery requests, including composing answers to interrogatories and attending to production of documents responsive to discovery requests from one's opponent.

In one embodiment, each party is provided with a menu or form that separates out discovery specification categories, identifying areas of agreement, areas of disagreement, and areas that are incomplete. Actions to be taken on the various line items are served up to the parties programmatically and the forms are updated. For example, the system prompts both adverse parties to indicate agreement or disagreement on points contained in their specifications, e.g., to agree, disagree or defer. The results drive updates to the forms which are stored in the database related to the actions, and the list of remaining points is that much shorter. For documenting agreed items, the process can provide a secure method to ensure authorization such as passwords and digital signatures associated with actions and dates.

During preliminary discussions, for disagreed items the user can choose to agree with adversary (i.e., to concede the point), to offer a compromise or counteroffer (to which the adversary likewise might agree, disagree or propose compromise), or the item can be identified as a meet-and-confer agenda item, namely a disputed point on which neither party is yet willing to concede or compromise. For unaddressed or deferred "non-answer/incomplete" items, the user(s) can choose to address or to ignore the issue, or can identify that item as a new meet-and-confer agenda item.

In an instance where one or the other of the parties elects to offer a compromise option rather than to accept an offered option, the system provides a process or workflow for the party to edit the unaccepted specification item or to define a substitute specification item as an alternative. The edited alternative or substitute becomes associated with the original unaccepted choice. The system provides notice to the adversary of the compromise or alternative and prompts the adversary to reevaluate the proposed new specification. The parties' respective agreements, disagreements, deferrals, offers of compromise, substitutes and preferably also any comments that the parties care to associate with them, are accumulated as a record of the negotiation that can be reviewed by the parties. The negotiations are facilitated in this way because each of the participants have an organized source for reviewing the choices they are being currently offered, the offers that they have made or been made previously, etc. According to one embodiment wherein the meet-and-confer session is conducted in a managed videoconference setting, transcripts of the conference based upon the audio and system interactions also can be retained for future reference and as a record of negotiated items. Also, as discussed, the system can be arranged to produce a Form-35 report to the court.

Under the Federal Rules of Evidence, statements made in an effort to negotiate compromise settlements are generally not admissible as evidence. However in one embodiment, the parties can agree to permit the judge or magistrate and his supporting staff to review and examine portions of the specification items that are subject to negotiation, such as the list of items that are agreed, disputed or still deferred. The court preferably has the option to communicate with the parties electronically through the system, possibly commenting in a way that might inform one or more of the parties about the outlook if they should choose to take a particular dispute to the court for a resolution.

In using the system, parties and their counsel can benefit from experience, at least having the ability to determine pertinent information about custodians and data sources from investigations made in connection with previous litigation matters. The parties preferably are provided an opportunity to store and re-use templates for specifications or parts of specifications. For example, a law firm may develop preferred templates for particular causes of action. A corporation may develop templates that it prefers its attorneys to use. These templates are made available to be used as starting points when appropriate for a particular litigation matter.

In add addition to storing templates that have proved useful, in one embodiment the system also stored historical experience data for use in assessing proposed specifications. This facility is useful, for example, to assess costs. The system provides a method to store a record of actual costs incurred when conducting discovery according to a particular specification, for example a cost per sheet or per file or per email message, etc., incurred when producing documents in a defined way during previous litigation. The historical costs can be inserted to provide more accuracy in estimates, projections and analyses in subsequent litigation. The same aspect is likewise useful to improve estimates and projections as to man hours, time constraints and the like, as well as costs.

The system as disclosed has built in capabilities for a party to assess its situation as a factual matter, e.g., to quantify and qualify its sources of information. According to an advantageous aspect, the system also enables the party to assess its situation legally, by providing ready access to pertinent rules of procedure and associated judicial decisions. This feature can be relatively uncomplicated, such as by providing a text string searchable copy of the rules of procedure and the rules of evidence. In an alternative embodiment, the system can be linked to legal research databases such as Lexis/Nexis, Westlaw, BNA, CCH, etc. This capability is particularly useful for determining and reporting upon any reported discovery-related decisions of the particular judge or magistrate assigned to the matter at issue.

In one embodiment, the system supports a collaborative work space, organized storage and handling of meet-and-confer agenda items as well as organized handling of items routinely addressed and resolved during negotiations, methods to view opposing positions, a way to communicate proposals and to comment on proposals, background information including factual and legal information, a way to document the terms that ultimately are agreed or finally deemed to be disagreed, and various analytical tools to support the process.

Among other tools, an analytic tool known as the recommendation wizard, is available to enable a party to address a disagreed agenda item by querying the system for potential alternatives to the ones being considered. Thus, for example, a party may be dissatisfied with some aspect of cost or timing of document production according to one set of document selection and processing steps. That party can query the recommendation wizard tool of the system to propose a range of different document selection and/or processing steps. The system as described can report estimates of the cost and timing projected according to each such alternative. An analytic tool known as the "eDiscovery Budget Projector" enables attorneys and administrators to analyze the costs of e-discovery based upon their preferences, their adversaries, or a combination in conference.

The invention is useful for an individual party to manage its initial disclosures to satisfy rule based discovery requirements. The initial disclosures can be generated electronically from client specific information that is produced by conducting the party and matter scoping steps described above, and storing the results in the system database. The invention is useful for efficiently negotiating a discovery plan in a manner that is transparent as to expected costs and benefits, assuming that the parties can agree to a discovery plan. If the parties cannot agree and must seek the supervision of the court, the invention ensures compliance with meet-and-confer obligations and backs up such compliance with useful information as to the parties' positions and how those positions were reached.

It is useful for attorneys to fully appreciate the nature of data files and systems that their client and the opposing litigating entities maintain. This includes data files in their native format and also other formats that might optionally be chosen as formats to which selected documents and the like might be converted when extracted from their sources. It may be unwieldy to deal with and to search and review documents in alternative native formats, so there is an incentive to request some standard format. However, a person knowledgeable about the native format may envision ways in which information in the files could be put to use. Also, converting documents may carry along data that may be important or may leave it behind. For example copying or compressing data files can change last-reviewed or last-modified dates in the file attributes. As another example, converting data files to document images might entail a loss of text string searching capability. An aspect of the present system is to provide a Metadata Dictionary of documentation to assist attorneys to understand various file types under discussion and the various Metadata elements associated with each type. In one embodiment, specifications can be established wherein attorneys are permitted to filter or limit elements found in the Metadata Dictionary. Thus, documents or files can be selected or deselected based on metadata values. Documents that are produced can be provided with or without defined metadata included. The metadata can be extensive, for example in connection with document management systems, often containing a database of document profile values, including the identities of users and times when files were viewed or modified, through an entire document history, and sometimes storing a series of previous versions of documents when the documents have been revised.

In connection with specific system data processing architecture arrangements, possible embodiments include systems that are operated from a single programmed terminal onto which users can log on, and wherein communications with users are over a LAN or WAN or over the Internet. However, a preferred arrangement employs a three tier architecture of the type supported by .Net. This is a client-server architecture in which the user interface, the functional process logic and the data storage and data access functions are independent interacting modules, typically operated on separate platforms.

A presentation tier is a topmost level of the application interfacing with users. The presentation tier displays information related to services such as presenting interface screens, accepting input from users and the like. The presentation tier comprises one or more servers communicating with users who operate browsers on terminals that typically have audio and visual input/output, keyboard and pointing devices and similar facilities to interface with human users. In the presentation layer, the user interface is implemented. This layer performs the role of displaying the information and receives inputs from the user. This layer communicates with an application tier in order to access object files. The graphical user interface (GUI) can be implemented through .aspx pages which use CSS for style sheets and Jquery for front end utilities.

Figure 14A:
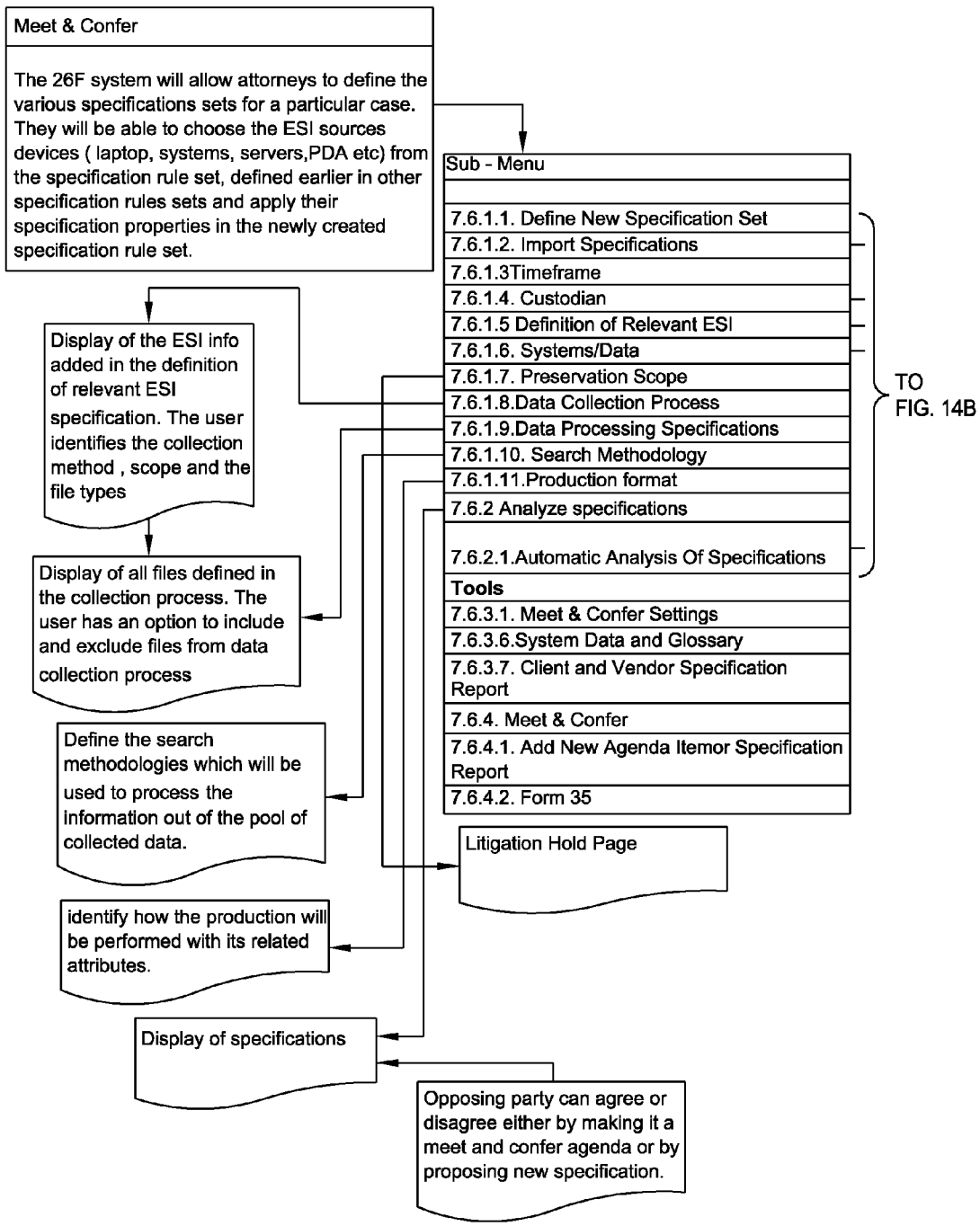
FIG. 14 is an overview functional flowchart consisting of FIGS. 14A, 14B and 14C, which are commonly referenced as FIG. 14 in this description.
Figure 14B:
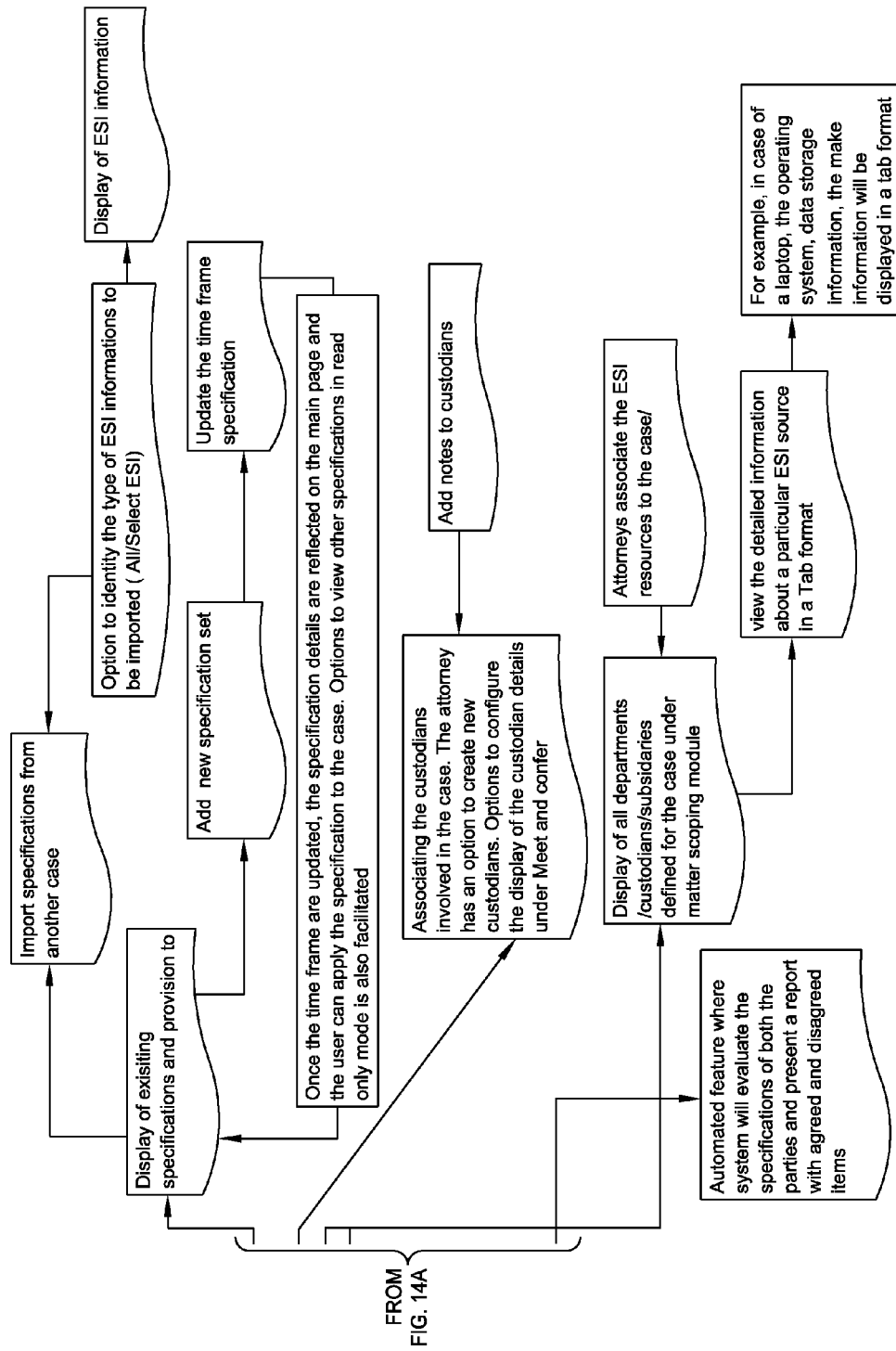
Figure 14C:
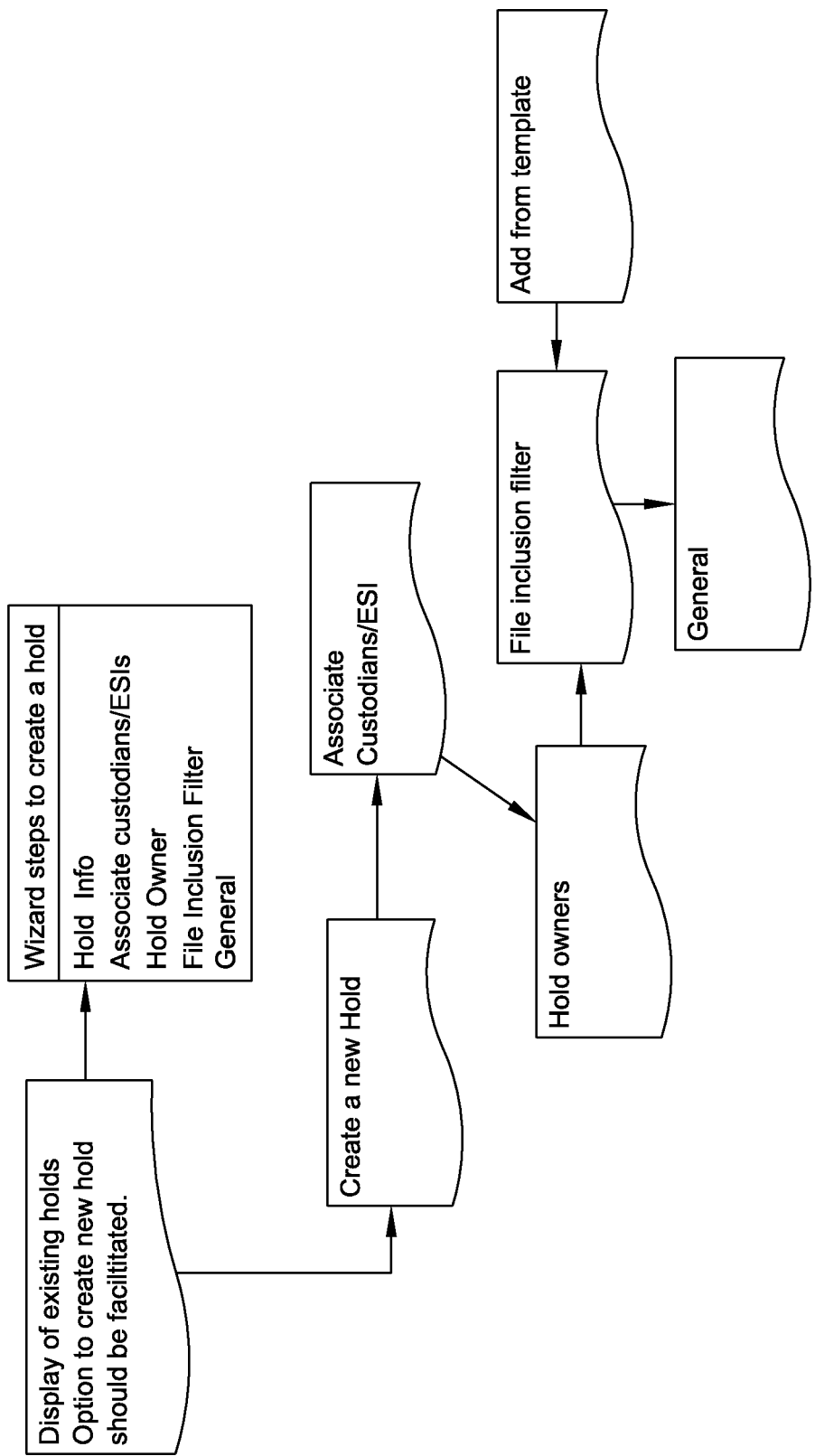
Figure 15:
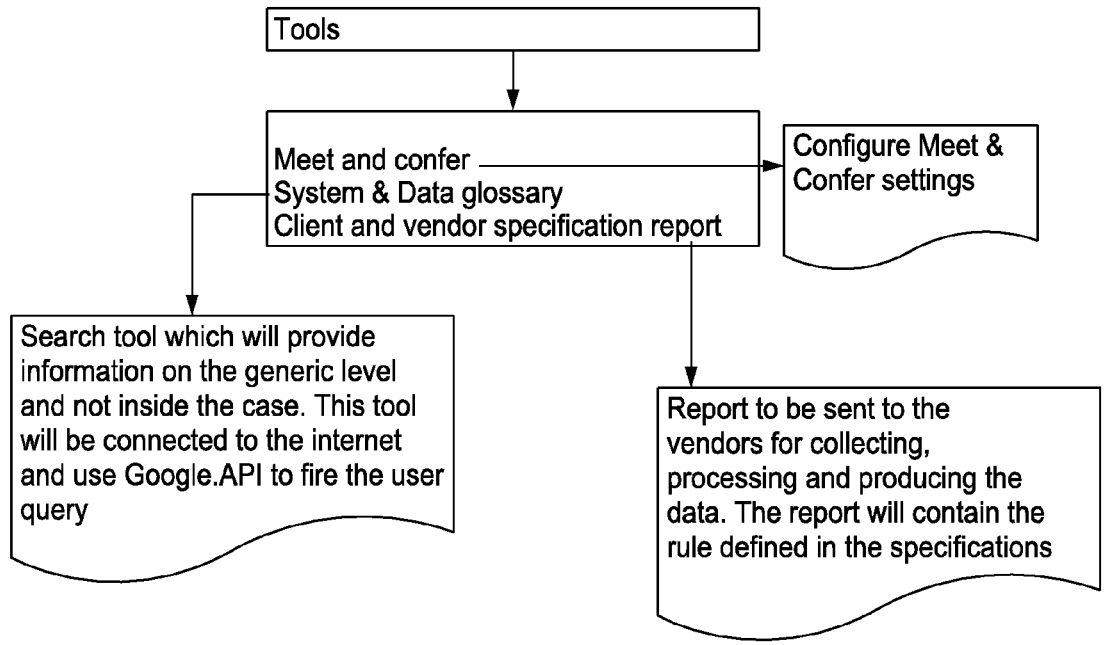
FIG. 15 is a functional flowchart respecting the Tools submenu.
Figure 16:
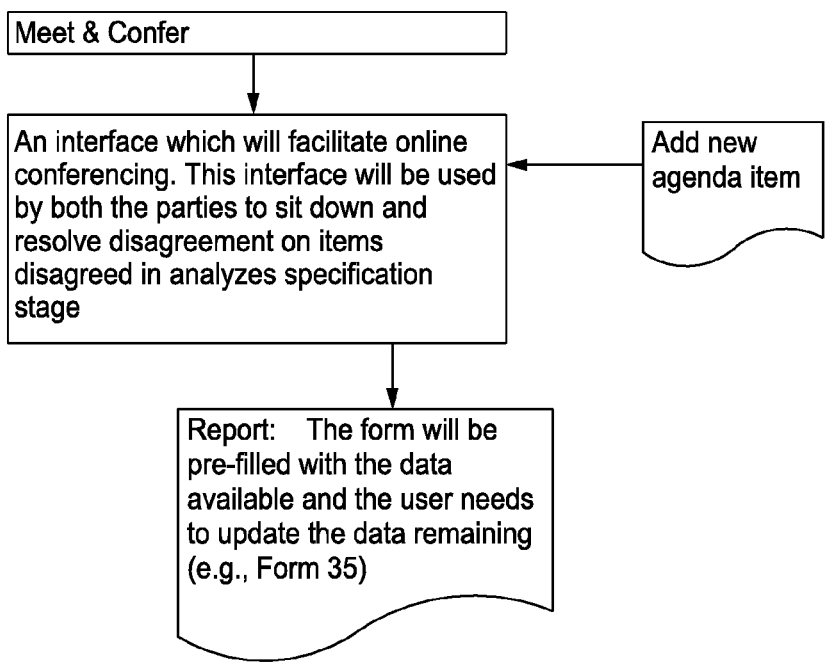
FIG. 16 is a functional flowchart respecting the meet-and-confer submenu.

The application tier or layer, sometimes described as the business logic, logic tier, data access tier, or middle tier, comprises one or more servers that communicates with the presentation tier and controls the application's functionality by performing detailed processing. The application tier also communicates with a data tier that comprises one or more database servers. The data tier stores and retrieves information. This tier arrangement is such that the system is readily accessible to users, is highly scalable, and maintains good performance. FIG. 14 is an overview flowchart showing a number of related functions supported at the application layer. FIG. 15 specifically illustrates a Tools function for turning system information into a search tool and in fact invoking the search tool. FIG. 16 specifically illustrates inserting agenda items into a meet-and-confer session agenda and finally producing a Form 35.

The application tier or layer defines the objects and the logic that are used across the application. This layer accesses the data layer for read and write information to the database. The data layer executes the actual database operations. The definition of data structures and stored procedures used in the business logic exist in this layer.

The three tier architecture is scalable because the application servers can be deployed on many machines. The database no longer requires a connection from every client; it only requires connections from a number of application servers that is less than the number of clients. The three tier architecture is secure because all updates go through the middle or application tier. The middle tier can ensure that only valid data is allowed to be updated in the database. The risk of a rogue client application corrupting data is reduces by strictly defining the operations that middle tier can accomplish via the data tier. Security can be implemented at multiple levels (not just at the database). Security can be granted on a service-by-service basis. Since the client does not have direct access to the database, it is difficult for a client to obtain unauthorized data. The applications tier is generally secure because it is operated on a secure central server.

Changes to the operational programming of the system can be implemented substantially by updating the software on the application servers. The actual structure of the database is hidden from the user, making it possible that many database changes can be made transparently. Thus, a service in the middle tier that exchanges information/data with other applications can retain its original interface in some instances where the underlying database structure is enhanced (e.g., to add new capabilities and data fields) during a new release. Even if the interface between the middle tier should be revised to add capabilities, it is not necessary to change the software on client terminals, which access the system via standardized browsers, e.g., Microsoft Internet Explorer, Apple Safari or another browser. Mission-critical applications can make use of redundant application servers and redundant database servers, making it possible to rely on other servers in many instances where a network communication path or an isolated server may fail.

In a preferred arrangement, the meet-and-confer videoconferencing functions are supported by one or more Adobe Flash media servers. Appropriate hardware to support a Flash media server can include, for example, Dual Core Intel Xeon 3.0's with 4 MB cache. (A single server can handle streaming up to 1000 concurrent users.) Adobe recommends an 8 GB DDR RAM. A 500 GB Hard disc is recommended in an SAS with RAID 10 configuration. Additional storage is recommended for server side audiovisual recording as described. The hardware also preferably employs 2×1 GB fast Ethernet cards. Appropriate software for the Flash media server includes a Windows 2008 Server, Enterprise Version, 64 bit, running Flash Media Server Version 4.0. The bandwidth required on the hosting side is 600 Mbps minimum (assuming 125 simultaneous chat rooms are operated, each with 4 participants attending meet-and-confer sessions).

The user terminals (operating the browsers) need to have downloaded a Flash player in this arrangement. Flash Media server 4.0 will support streaming via Flash Player 6 and later. Additionally, Flash Player 7 and later support HTTP progressive delivery. Flash Player 9,0,115 and later support the encrypted RTMP (RTMPE), SWF file verification, and H.264/AAC. The current Flash Player (version 10) supports RTMFP, multicast, HTTP Dynamic Streaming, and RTMP Dynamic Streaming.

The applications server hardware can include one or more Dual Core Intel Xeon 3.0's, each with 4 MB cache, 32 or 64 GB DDR RAM, two 500 GB hard disc SAS with RAID 1, and two 1 GB fast Ethernet cards. The applications server operating system can be a Windows 2008 Server, Standard Version, 64 bit. Preferably the server operates behind a firewall and has antivirus software, e.g., from Symantec or AVG.

The database server likewise comprises a Dual Core Intel Xeon 3.0 with 4 MB cache, 32 or 64 GB DDR RAM, two 500 GB hard disc SAS with RAID 1, and a 1 GB fast Ethernet card. The database server preferably includes a tape backup system. The database server operates a Windows 2008 Server operating system, Standard Version, 64 bit, and SQL Server 2008, Enterprise Version. Preferably the database server operates behind a firewall and has antivirus software, e.g., from Symantec or AVG. Inasmuch as the database server and the applications server use the same operating system, the two can be arranged to function as standby units for one another should there be a server crash.

An Appendix to this disclosure sets forth a starting set of tables, variables with names that are substantially self explanatory, and associated variable types and byte or bit lengths.

The system as disclosed provides an organized way of documenting in electronic form in a database the organizational structure of a litigant and the nature of information available to the litigant. In a case where the litigant's opponents also participate, the respective parties have at least some confidence that the same standards and processes were used to collect information. As discussed, this information is useful in connection with stipulated discovery plans. However the information collected and the tools that the system provides can also be quite useful during ongoing phases of the litigation. The system can be updated and re-accessed at any time for such uses as querying datasets for new search criteria or variations of criteria previously run (e.g., when further discovery or testimony reveals that new queries are pertinent). Stored data and metadata might be referenced for such purposes. Updated budget projections and cost summations can be run. Insofar as assumptions may prove inaccurate, new estimates of time and cost requirements can be produced using the same tools and the same datasets used initially to plan discovery.

The inventive method for managing discovery in a legal proceeding involving at least two adverse parties comprises establishing a specifically configured data processing system in communication with the adverse parties over a data network. For at least one of the adverse parties, a questionnaire is distributed electronically, prompting at least one representative for information identifying and defining information custodians and information that is subject to discovery in the legal proceeding. A database established and accessible to the data processing system contains fields wherein the information subject to discovery is qualified and quantified. The method includes assessing the application of discovery specifications to the database. Specifically, the discovery specifications include a definition of one of a scope of input from the information subject to discovery, a processing step by which the information subject to discovery is one of classified, quantified, queried, selected, redacted, altered, indexed, numbered, reformatted, and a defined format by which a result shall be stored as output. These aspects affect the quality, quantity and character of responses that would result if the discovery specifications are adopted and effected, and also the costs that would be incurred and the man-hours and/or machine hours obliged to be spent. The process comprises assessing the application of discovery specifications to the database according to at least two alternative discovery specifications that differ in at least one criterion, and comparing the alternatives with respect to at least one of a quality, quantity, cost requirement and time requirement. At least one of the adverse parties is provided a report as to a result of comparing the at least two alternative discovery specifications. This can be done in connection with a negotiation between the adverse parties toward a stipulated discovery plan. At least part of the report is communicated between the adverse parties in advocating or opposing one of the at least two alternative discovery specifications.

Advantageously, both adverse parties to a litigation matter participate in the inventive method, entering information to define their own data and revealing only so much as strategically benefits their negotiation. In one embodiment, the data processing system is operated for substantially concurrently service of adverse parties in plural legal proceedings that can be unrelated, and separately and securely maintaining fields in the database for each of the adverse parties served. In a situation in which only one of two adverse parties participates, the database is partially populated for the nonparticipating party using such information as may be made available. This benefits the participating party, who has more information at hand, but the partially populated database is useful for comparing discovery specifications offered by each of the parties to the other party and demanded by each of the parties of the other party.

In general, the method supports mediating the negotiation by reporting to the parties the effects associated with acceding to a point proposed or demanded by the other party. A meet-and-confer session preferably is a final step in the negotiation leading to a stipulated discovery plan. However if no agreement is reached, the negotiation and progress toward agreement can be logged. The meet-and-confer session can be recorded via the data processing system to memorialize points of agreement and disagreement regarding the specifications applicable to the respective adverse parties. In addition to recording progress via the data processing system, the system generates an ultimate report for presentation to the court. Arguments and exhibits presented by the respective parties during the meet-and-confer session are appended to the report for submission to the court and documenting discovery issues remaining to be resolved after the meet-and-confer session.

The inventive system can be used in connection with actually responding to discovery requests. In that case, the data processing system is exercised to execute queries against the information that is subject to discovery in the legal proceeding and produces the output according to an agreed discovery specification. Alternatively, the inventive system can be coupled to a search-query system that is capable of actually executing queries to filter files and documents from a sequestered litigation-hold dataset.

The invention has been described in connection with a programmed processor and method steps that are undertaken using the processor. The invention likewise comprises the stored programming as physically embodied in a programmed data carrier containing executable coding that when executed by a data processor is operable for accomplishing the stated steps.

The inventive system has been disclosed in connection with exemplary embodiments and examples. It should be understood that the invention is subject to variation, and is not limited to the embodiments specifically mentioned as examples, but rather is defined by the scope of the appended claims.

APPENDIX

EXEMPLARY DATABASE TABLES

| Sno | Table Name | Column Name | Data Type |
| --- | --- | --- | --- |
| 1 | DashBoardPosition | Sno | int(PK) |
| | | cases | varchar(50) |
| | | AlertsAndNotification | varchar(50) |
| | | Calendar | varchar(50) |
| | | Collections | varchar(50) |
| | | LoggedinUsers | varchar(50) |
| | | DocumentsReview | varchar(50) |
| | | UserId | varchar(50) |

APPENDIX-continued

EXEMPLARY DATABASE TABLES

| Sno | Table Name | Column Name | Data Type |
|---|---|---|---|
| 2 | F26_CaseAttachments | CaseAttachmentId | int(PK) |
| | | CaseId | bigint |
| | | Attachments | varchar(1000) |
| | | CreatedOn | datetime |
| | | CreatedBy | varchar(30) |
| | | ModifiedOn | datetime |
| | | ModifiedBy | varchar(30) |
| 3 | F26_CaseDetail | CaseDetailId | int(PK) |
| | | CaseId | int |
| | | Rep_Issue_UserId | int |
| | | Rep_Issue_UserFlag | char(1) |
| 4 | F26_CaseMaster | CaseId | int(PK) |
| | | CaseName | varchar(50) |
| | | CaseNo | int |
| | | CompanyId | int |
| | | CaseDocketNo | varchar(50) |
| | | CourtLocation | varchar(50) |
| | | CaseDescription | varchar(500) |
| | | Live | char(1) |
| | | CreatedOn | datetime |
| | | CreatedBy | varchar(30) |
| | | ModifiededOn | datetime |
| | | ModifiedBy | varchar(30) |
| | | CaseType | int |
| | | TemporaryFlag | char(1) |
| 5 | F26_CaseScheduleTask | CaseScheduleId | int(PK) |
| | | CaseId | bigint |
| | | ScheduleSubject | varchar(1000) |
| | | ScheduleDate | datetime |
| | | ScheduleDescription | varchar(1000) |
| | | CreatedOn | datetime |
| | | CreatedBy | varchar(30) |
| | | ModifiedOn | datetime |
| | | ModifiedBy | varchar(30) |
| 6 | F26_CaseSettings | CaseSettingId | int(PK) |
| | | CaseId | bigint |
| | | CaseDivision | varchar(500) |
| | | CaseDepartment | varchar(500) |
| | | CaseEmployees | varchar(1000) |
| | | TimeFrameStartDate | datetime |
| | | TimeFrameEndDate | datetime |
| | | CreatedOn | datetime |
| | | CreatedBy | varchar(30) |
| | | ModifiedOn | datetime |
| | | ModifiedBy | varchar(30) |
| 7 | F26_CaseSubjectMatter | SubjectMatterId | int(PK) |
| | | CaseId | bigint |
| | | SubjectMatterTitle | varchar(500) |
| | | SubjectDescription | varchar(500) |
| | | CreatedOn | datetime |
| | | CreatedBy | varchar(30) |
| | | ModifiedOn | datetime |
| | | ModifiedBy | varchar(30) |
| 8 | F26_CaseTypeMaster | CaseTypeId | int(PK) |
| | | CaseTypeName | varchar(50) |
| | | CaseTypeDescription | varchar(200) |
| | | CreatedOn | datetime |
| | | CreatedBy | varchar(30) |
| | | ModifiedOn | datetime |
| | | ModifiedBy | varchar(30) |
| 9 | F26_CollectionProcess | CollectionProcessId | int(PK) |
| | | CollectionProcessName | varchar(50) |
| | | CreatedOn | datetime |
| | | CreatedBy | varchar(30) |
| | | ModifiedOn | datetime |
| | | ModifiedBy | varchar(30) |
| 10 | F26_Company | CompanyId | int (PK) |
| | | CompanyName | varchar(50) |
| | | CompanyAddress | varchar(100) |
| | | CompanyWebsite | varchar(50) |
| | | CompanyLicenceType | int |
| | | CompanyDataLimit | int |
| | | Company_No_Cases | int |
| | | CompanyStartDate | datetime |
| | | CompanyEndDate | datetime |
| | | Company_Admin | varchar(50) |

APPENDIX-continued

EXEMPLARY DATABASE TABLES

| Sno | Table Name | Column Name | Data Type |
|---|---|---|---|
| | | Company_Admin_Pwd | varchar(50) |
| | | Company_Admin_Email | varchar(50) |
| | | Company_Admin_Phone | varchar(50) |
| | | CreatedOn | datetime |
| | | CreatedBy | varchar(30) |
| | | ModifiededOn | datetime |
| | | ModifiedBy | varchar(30) |
| 11 | F26_CustodianCategoryMaster | CategoryId | int(PK) |
| | | CategoryName | varchar(50) |
| | | CategoryDescription | varchar(200) |
| | | Live | char(1) |
| | | CreatedOn | datetime |
| | | CreatedBy | varchar(30) |
| | | ModifiedOn | datetime |
| | | ModifiedBy | varchar(30) |
| 12 | F26_CustodianCategoryTypeMaster | CategoryTypeId | int(PK) |
| | | CategoryId | int |
| | | CategoryType | varchar(50) |
| | | CategoryTypeDescription | varchar(200) |
| | | ParentCategoryType | varchar(50) |
| | | ParentCategoryTypeId | varchar(50) |
| | | CreatedOn | datetime |
| | | CreatedBy | varchar(30) |
| | | ModifiedOn | datetime |
| | | ModifiedBy | varchar(30) |
| 13 | F26_Custodians | CaseCustodianId | int(PK) |
| | | CompanyId | int |
| | | CaseId | int |
| | | CustodianId | varchar(500) |
| | | CreatedOn | datetime |
| | | CreatedBy | varchar(30) |
| | | ModofiedOn | datetime |
| | | ModifiedBy | varchar(30) |
| 14 | F26_CustodianSpecification | CustodianId | int(PK) |
| | | CustodianName | varchar(50) |
| | | Party | varchar(50) |
| | | Priority | int |
| | | CaseIssue | varchar(50) |
| | | SubjectMatter | varchar(30) |
| | | CreatedOn | datetime |
| | | CreatedBy | varchar(30) |
| 15 | F26_CustodianSurveyAttachmentDetail | SurveyAttachmentId | int(PK) |
| | | SurveyId | int |
| | | Attachment | varchar(100) |
| | | Live | char(1) |
| | | CreatedOn | datetime |
| | | CreatedBy | varchar(30) |
| | | ModifiedOn | datetime |
| | | ModifiedBy | varchar(30) |
| 16 | F26_CustodianSurveyCategory | SurveyCategoryId | int(PK) |
| | | SurveyId | bigint |
| | | CategoryId | bigint |
| 17 | F26_CustodianSurveyCategoryTypeDetail | SurveyCategoryTypeId | int |
| | | SurveyId | int |
| | | CategoryId | varchar(50) |
| | | CategoryTypeId | varchar(200) |
| | | CreatedOn | datetime |
| | | CreatedBy | varchar(30) |
| | | ModifiedOn | datetime |
| | | ModifiedBy | varchar(30) |
| 18 | F26_CustodianSurveyCategoryTypeDetail | SurveyCategoryTypeId | int(PK) |
| | | SurveyId | int |
| | | CategoryId | varchar(50) |
| | | CategoryTypeId | varchar(200) |
| | | CreatedOn | datetime |
| | | CreatedBy | varchar(30) |
| | | ModifiedOn | datetime |
| | | ModifiedBy | varchar(50) |
| 19 | F26_CustodianSurveyComments | CommentsId | int(PK) |
| | | SurveyId | int |
| | | QuestionId | int |
| | | UserId | varchar(500) |
| | | Comments | varchar(2000) |
| | | CommentsUrl | varchar(500) |
| | | live | char(1) |
| | | CreatedOn | datetime |

APPENDIX-continued

EXEMPLARY DATABASE TABLES

| Sno | Table Name | Column Name | Data Type |
|---|---|---|---|
|  |  | CreatedBy | varchar(30) |
|  |  | ModifiedOn | datetime |
|  |  | ModifiedBy | varchar(30) |
| 20 | F26_CustodianSurveyMaster | SurveyId | int(PK) |
|  |  | CompanyId | int |
|  |  | CaseId | int |
|  |  | SurveyType | char(1) |
|  |  | SurveyName | varchar(50) |
|  |  | SurveyDescription | varchar(100) |
|  |  | SurveyPath | varchar(100) |
|  |  | IPAddress | varchar(50) |
|  |  | UserName | varchar(50) |
|  |  | Password | varchar(30) |
|  |  | Domain | varchar(50) |
|  |  | Comments | varchar(100) |
|  |  | NoOfPersonsAssigned | int |
|  |  | NoOfPersonsResponded | int |
|  |  | SurveyLaunch | char(1) |
|  |  | Live | char(1) |
|  |  | CreatedOn | datetime |
|  |  | CreatedBy | varchar(30) |
|  |  | ModifiedOn | datetime |
|  |  | ModifiedBy | varchar(30) |
|  |  | NoOfAssignedUsers | varchar(200) |
|  |  | SurveyLevel | int |
| 21 | F26_CustodianSurveyQuestionAnswers | QAId | int(PK) |
|  |  | SurveyId | int |
|  |  | QuestionType | char(1) |
|  |  | QuestionId | int |
|  |  | Answer | varchar(500) |
|  |  | UserId | varchar(30) |
|  |  | Comments | varchar(500) |
|  |  | CreatedOn | datetime |
|  |  | CreatedBy | varchar(30) |
|  |  | ModifiedOn | datetime |
|  |  | ModifiedBy | varchar(30) |
| 22 | F26_CustodianSurveyQuestions | SurveyQuestionId | int(PK) |
|  |  | SurveyId | int |
|  |  | Question | varchar(1000) |
|  |  | QuestionType | char(1) |
|  |  | QuestionChoice | varchar(2000) |
|  |  | Tooltip | varchar(100) |
|  |  | Live | char(1) |
|  |  | CreatedOn | datetime |
|  |  | CreatedBy | varchar(30) |
|  |  | ModifiedOn | datetime |
|  |  | ModifiedBy | varchar(30) |
| 23 | F26_DashBoardPosition | Sno | int(PK) |
|  |  | cases | varchar(50) |
|  |  | AlertsAndNotification | varchar(50) |
|  |  | Calendar | varchar(50) |
|  |  | Collections | varchar(50) |
|  |  | LoggedinUsers | varchar(50) |
|  |  | DocumentsReview | varchar(50) |
|  |  | UserId | varchar(50) |
|  |  | SelectedCheck | varchar(50) |
| 24 | F26_DataLimitMaster | DataLimitId | int(PK) |
|  |  | DataLimitName | varchar(50) |
|  |  | CreatedOn | datetime |
|  |  | CreatedBy | varchar(30) |
|  |  | ModifiededOn | datetime |
|  |  | ModifiedBy | varchar(30) |
| 25 | F26_DepartmentMaster | DepartmentId | int (PK) |
|  |  | DepartmentName | varchar(50) |
|  |  | CompanyId | int |
|  |  | DivisionId | int |
|  |  | CreatedOn | datetime |
|  |  | CreatedBy | varchar(30) |
|  |  | ModifiededOn | datetime |
|  |  | ModifiedBy | varchar(30) |

APPENDIX-continued

EXEMPLARY DATABASE TABLES

| Sno | Table Name | Column Name | Data Type |
|---|---|---|---|
| 26 | F26_DivisionMaster | DivisionId | int (PK) |
| | | DivisionName | varchar(50) |
| | | CompanyId | int |
| | | CreatedOn | datetime |
| | | CreatedBy | varchar(30) |
| | | ModifiededOn | datetime |
| | | ModifiedBy | varchar(30) |
| 27 | F26_EmployeeMaster | EmployeeId | int (PK) |
| | | FirstName | varchar(50) |
| | | MiddleName | varchar(50) |
| | | LastName | varchar(50) |
| | | Title | varchar(50) |
| | | LocationId | int |
| | | EmailId | varchar(50) |
| | | CurrentEmployee | varchar(50) |
| | | DateOfHire | datetime |
| | | DateOfTermination | datetime |
| | | Exec_AssistanceName | varchar(50) |
| | | EmployeeNumber | varchar(50) |
| | | CompanyId | int |
| | | DepartmentId | int |
| | | SubsidaryId | int |
| | | Type | char(1) |
| | | CustodiansType | char(1) |
| | | CustodiansStatus | char(1) |
| | | CreatedOn | datetime |
| | | CreatedBy | varchar(30) |
| | | ModifiedOn | datetime |
| | | ModifiedBy | varchar(30) |
| 28 | F26_ErrorPageDetails | ErrorId | int(PK) |
| | | ErrorNo | int |
| | | ErrorCode | varchar(100) |
| | | ErrorDescription | varchar(2000) |
| | | CreatedOn | datetime |
| | | CreatedBy | varchar(30) |
| | | ModifiededOn | datetime |
| | | ModifiedBy | varchar(30) |
| 29 | F26_ESICategoryMaster | CategoryId | int(PK) |
| | | CategoryName | varchar(50) |
| | | CategoryDescription | varchar(200) |
| | | Live | char(1) |
| | | CreatedOn | datetime |
| | | CreatedBy | varchar(30) |
| | | ModifiedOn | datetime |
| | | ModifiedBy | varchar(30) |
| 30 | F26_ESICategoryTypeMaster | CategoryTypeId | int(PK) |
| | | CategoryId | int |
| | | CategoryType | varchar(50) |
| | | CategoryTypeDescription | varchar(200) |
| | | ParentCategoryType | varchar(50) |
| | | ParentCategoryTypeId | varchar(50) |
| | | CreatedOn | datetime |
| | | CreatedBy | varchar(30) |
| | | ModifiedOn | datetime |
| | | ModifiedBy | varchar(30) |
| 31 | F26_Faq | FaqId | int(PK) |
| | | ModuleId | int |
| | | FaqText | text |
| | | CreatedOn | datetime |
| | | CreatedBy | varchar(30) |
| | | ModifiedOn | datetime |
| | | ModifiedBy | varchar(30) |
| 32 | F26_FaqMaster | FaqId | int(PK) |
| | | FaqName | varchar(50) |
| | | FaqParentorChild | char(1) |
| | | ParentId | int |
| | | CreatedOn | datetime |
| | | CreatedBy | varchar(30) |
| | | ModifiededOn | datetime |
| | | ModifiedBy | varchar(30) |

APPENDIX-continued

EXEMPLARY DATABASE TABLES

| Sno | Table Name | Column Name | Data Type |
|---|---|---|---|
| 33 | F26_Help | HelpId | int(PK) |
| | | ModuleId | int |
| | | HelpText | text |
| | | CreatedOn | datetime |
| | | CreatedBy | varchar(30) |
| | | ModifiedOn | datetime |
| | | ModifiedBy | varchar(30) |
| 34 | F26_IssueMaster | IssueId | int (PK) |
| | | IssueName | varchar(50) |
| | | IssueDescription | varchar(500) |
| | | CompanyId | int |
| | | CreatedOn | datetime |
| | | CreatedBy | varchar(30) |
| | | ModifiededOn | datetime |
| | | ModifiedBy | varchar(30) |
| 35 | F26_LicenseMaster | LicenseId | int (PK) |
| | | LicenseName | varchar(50) |
| | | CreatedOn | datetime |
| | | CreatedBy | varchar(30) |
| | | ModifiededOn | datetime |
| | | ModifiedBy | varchar(30) |
| 36 | F26_Location | LocationId | int (PK) |
| | | LocationName | varchar(50) |
| | | LocationDescription | varchar(50) |
| | | LocationAddress1 | varchar(50) |
| | | LocationAddress2 | varchar(50) |
| | | LocationAddress3 | varchar(50) |
| | | City | varchar(50) |
| | | Pincode | int |
| | | Country | varchar(50) |
| | | Telephone1 | int |
| | | Telephone2 | int |
| | | Telephone3 | int |
| | | CreatedOn | datetime |
| | | CreatedBy | varchar(30) |
| | | ModifiedOn | datetime |
| | | ModifiedBy | varchar(30) |
| 37 | F26_Logging | LogId | int(PK) |
| | | CompanyId | int |
| | | CaseId | int |
| | | ActionTo | varchar(200) |
| | | CreatedOn | datetime |
| | | CreatedBy | varchar(30) |
| | | ModifiedOn | datetime |
| | | ModifiedBy | varchar(30) |
| | | DeletedOn | datetime |
| | | DeletedBy | varchar(30) |
| 38 | F26_LookUpData | LookUpDataId | int (PK) |
| | | LookUpTypeId | int |
| | | ProcessId | int |
| | | LookUpDataName | varchar(50) |
| | | LookUpDataDescription | varchar(50) |
| | | Live | char(1) |
| | | CreatedOn | datetime |
| | | CreatedBy | varchar(30) |
| | | ModifiedOn | datetime |
| | | ModifiedBy | varchar(30) |
| 39 | F26_LookUpTypeMaster | LookUpTypeId | int (PK) |
| | | LookUpTypeName | varchar(50) |
| | | CreatedOn | datetime |
| | | CreatedBy | varchar(30) |
| | | ModifiedOn | datetime |
| | | ModifiedBy | varchar(30) |
| 40 | F26_MeetconferHost | HostId | int |
| | | Username | varchar(250) |
| | | Password | varchar(50) |
| | | Mailid | varchar(250) |
| 41 | F26_ModuleMaster | ModuleId | int (PK) |
| | | ModuleName | varchar(50) |
| | | ModuleParentorChild | char(1) |
| | | ParentId | int |
| | | CreatedOn | datetime |
| | | CreatedBy | varchar(30) |
| | | ModifiededOn | datetime |
| | | ModifiedBy | varchar(30) |

APPENDIX-continued

EXEMPLARY DATABASE TABLES

| Sno | Table Name | Column Name | Data Type |
|---|---|---|---|
| 42 | F26_ModuleMasters | ModuleId | int (PK) |
| | | ModuleName | varchar(50) |
| | | ModuleParentorChild | char(1) |
| | | ParentId | int |
| | | CreatedOn | datetime |
| | | CreatedBy | varchar(30) |
| | | ModifiededOn | datetime |
| | | ModifiedBy | varchar(30) |
| 43 | F26_Organization | OrganizationId | int(PK) |
| | | LevelName | varchar(50) |
| | | Description | varchar(100) |
| | | LocationId | int |
| | | OwnerId_EmployeeId | int |
| | | ParentId | int |
| | | CompanyId | int |
| | | Live | char |
| | | CreatedOn | datetime |
| | | CreatedBy | varchar(30) |
| | | ModifiedOn | datetime |
| | | ModifiedBy | varchar(30) |
| 44 | F26_PartyMaster | RepresentativeId | int (PK) |
| | | RepresentativeName | varchar(50) |
| | | CompanyId | int |
| | | CreatedOn | datetime |
| | | CreatedBy | varchar(30) |
| | | ModifiededOn | datetime |
| | | ModifiedBy | varchar(30) |
| 45 | F26_RoleMaster | RoleId | int (PK) |
| | | RoleName | varchar(50) |
| | | CompanyId | int |
| | | Live | char(1) |
| | | CreatedOn | datetime |
| | | CreatedBy | varchar(30) |
| | | ModifiededOn | datetime |
| | | ModifiedBy | varchar(30) |
| 46 | F26_RoleDetail | RoleDetailId | int (PK) |
| | | RoleId | int |
| | | ModuleId | int |
| | | FullorRead | char(1) |
| 47 | F26_SpecificationMaster | SpecificationId | int (PK) |
| | | SpecificationName | varchar(50) |
| | | SystemGeneratedFlag | char(1) |
| | | Live | char(1) |
| | | CreatedOn | datetime |
| | | CreatedBy | varchar(30) |
| | | ModifiedOn | datetime |
| | | ModifiedBy | varchar(30) |
| 48 | F26_SpecificationDetail | SpecificationDetailId | int (PK) |
| | | SpecificationId | int |
| | | Question | varchar(200) |
| | | QuestionType | char(1) |
| | | QuestionChoice | varchar(200) |
| | | Live | char(1) |
| 49 | F26_SpecificationSet | SpecificationSetId | int(PK) |
| | | Name | varchar(50) |
| | | Description | varchar(500) |
| | | CreatedOn | datetime |
| | | CreatedBy | varchar |
| 50 | F26_SpecTimeFrame | TimeFrameId | int(PK) |
| | | CompanyId | int |
| | | CaseId | int |
| | | SpecificationName | varchar(50) |
| | | SpecificationDescription | varchar(200) |
| | | StartDate | datetime |
| | | EndDate | datetime |
| | | CreatedOn | datetime |
| | | CreatedBy | varchar(30) |
| | | ModifiedOn | datetime |
| | | ModifiedBy | varchar(30) |
| 51 | F26_SpecTimeFrameCustodian | TimeFrameCustodianId | int(PK) |
| | | SpecificationId | int |
| | | CustodianId | int |
| | | FromDate | datetime |
| | | ToDate | datetime |
| | | CreatedOn | datetime |
| | | CreatedBy | varchar(30) |

APPENDIX-continued

EXEMPLARY DATABASE TABLES

| Sno | Table Name | Column Name | Data Type |
|---|---|---|---|
| | | ModifiedOn | datetime |
| | | ModifiedBy | varchar(30) |
| | | Live | char(1) |
| 52 | F26_SpecTimeFrameDataSource | TimeFrameSourceId | int(PK) |
| | | SpecificationId | int |
| | | ESIType | varchar(50) |
| | | ESISource | varchar(50) |
| | | FromDate | datetime |
| | | ToDate | datetime |
| | | CreatedOn | datetime |
| | | CreatedBy | varchar(30) |
| | | ModifiedOn | datetime |
| | | ModifiedBy | varchar(30) |
| | | Live | char(1) |
| 53 | F26_SpecTimeFrameEntity | TimeFrameEntityId | int(PK) |
| | | SpecificationId | int |
| | | SubsidaryId | int |
| | | FromDate | datetime |
| | | ToDate | datetime |
| | | CreatedOn | datetime |
| | | CreatedBy | varchar(30) |
| | | ModifiedOn | datetime |
| | | ModifiedBy | varchar(30) |
| 54 | F26_SpecTimeFrameIssue | TimeFrameIssueId | int(PK) |
| | | SpecificationId | int |
| | | IssueId | int |
| | | FromDate | datetime |
| | | ToDate | datetime |
| | | CreatedOn | datetime |
| | | CreatedBy | varchar(30) |
| | | ModifiedOn | datetime |
| | | ModifiedBy | varchar(30) |
| | | Live | char(1) |
| 55 | F26_SpecTimeFrameLevel | TimeFrameLevelId | int(PK) |
| | | SpecificationId | int |
| | | LevelId | int |
| | | FromDate | datetime |
| | | ToDate | datetime |
| | | CreatedOn | datetime |
| | | CreatedBy | varchar(30) |
| | | ModifiedOn | datetime |
| | | ModifiedBy | varchar(30) |
| 56 | F26_SpecTimeFrameLocation | TimeFrameLocationId | int(PK) |
| | | SpecificationId | int |
| | | LocationId | int |
| | | FromDate | datetime |
| | | ToDate | datetime |
| | | CreatedOn | datetime |
| | | CreatedBy | varchar(30) |
| | | ModifiedOn | datetime |
| | | ModifiedBy | varchar(30) |
| | | Live | char(1) |
| 57 | F26_SpecTimeFrameSubject | TimeFrameSubId | int(PK) |
| | | SpecificationId | int |
| | | SubJectMatter | varchar(200) |
| | | FromDate | datetime |
| | | ToDate | datetime |
| | | CreatedOn | datetime |
| | | CreatedBy | varchar(30) |
| | | ModifiedOn | datetime |
| | | ModifiedBy | varchar(30) |
| | | Live | char(1) |
| 58 | F26_SubsidaryMaster | SubsidaryId | int (PK) |
| | | SubsidaryName | varchar(50) |
| | | CreatedOn | datetime |
| | | CreatedBy | varchar(30) |
| | | ModifiedOn | datetime |
| | | ModifiedBy | varchar(30) |
| 59 | F26_SurveyAttachmentDetail | SurveyAttachmentId | int(PK) |
| | | SurveyId | int |
| | | Attachment | varchar(100) |
| | | Live | char(1) |
| | | CreatedOn | datetime |
| | | CreatedBy | varchar(30) |
| | | ModifiedOn | datetime |
| | | ModifiedBy | varchar(30) |

APPENDIX-continued

EXEMPLARY DATABASE TABLES

| Sno | Table Name | Column Name | Data Type |
|---|---|---|---|
| 60 | F26_SurveyCategory | SurveyCategoryId | int(PK) |
| | | SurveyId | bigint |
| | | CategoryId | bigint |
| 61 | F26_SurveyCategoryTypeDetail | SurveyCategoryTypeId | int(PK) |
| | | SurveyId | int |
| | | CategoryId | varchar(50) |
| | | CategoryTypeId | varchar(200) |
| | | CreatedOn | datetime |
| | | CreatedBy | varchar(30) |
| | | ModifiedOn | datetime |
| | | ModifiedBy | varchar(30) |
| 62 | F26_SurveyComments | CommentsId | int(PK) |
| | | SurveyId | int |
| | | QuestionId | int |
| | | UserId | varchar(500) |
| | | Comments | varchar(2000) |
| | | CommentsUrl | varchar(500) |
| | | live | char(1) |
| | | CreatedOn | datetime |
| 63 | F26_SurveyMaster | SurveyId | int(PK) |
| | | CompanyId | int |
| | | SurveyType | char(1) |
| | | SurveyName | varchar(50) |
| | | SurveyDescription | varchar(100) |
| | | SurveyPath | varchar(100) |
| | | IPAddress | varchar(50) |
| | | UserName | varchar(50) |
| | | Password | varchar(30) |
| | | Domain | varchar(50) |
| | | Comments | varchar(100) |
| | | NoOfPersonsAssigned | int |
| | | NoOfPersonsResponded | int |
| | | SurveyLaunch | char(1) |
| | | Live | char(1) |
| | | CreatedOn | datetime |
| | | CreatedBy | varchar(30) |
| | | ModifiedOn | datetime |
| | | ModifiedBy | varchar(30) |
| | | NoOfAssignedUsers | varchar(200) |
| | | SurveyLevel | int |
| 64 | F26_SurveyQuestionAnswers | QAId | int |
| | | SurveyId | int |
| | | QuestionType | char(1) |
| | | QuestionId | int |
| | | Answer | varchar(500) |
| | | UserId | varchar(30) |
| | | Comments | varchar(500) |
| | | CreatedOn | datetime |
| | | CreatedBy | varchar(30) |
| | | ModifiedOn | datetime |
| | | ModifiedBy | varchar(30) |
| 65 | F26_SurveyQuestions | SurveyQuestionId | int(PK) |
| | | SurveyId | int |
| | | Question | varchar(1000) |
| | | QuestionType | char(1) |
| | | QuestionChoice | varchar(2000) |
| | | Tooltip | varchar(100) |
| | | Live | char(1) |
| | | CreatedOn | datetime |
| | | CreatedBy | varchar(30) |
| | | ModifiedOn | datetime |
| | | ModifiedBy | varchar(30) |
| 66 | F26_UserMaster | UId | int (PK) |
| | | UserId | varchar(30) |
| | | UserPassword | varchar(30) |
| | | UserName | varchar(50) |
| | | UserAddress | varchar(100) |
| | | UserEmail | varchar(50) |
| | | UserPhone | varchar(50) |
| | | UserFaxNo | varchar(50) |
| | | UserDept | int |
| | | UserDivision | int |
| | | UserRoleId | int |
| | | CompanyId | int |
| | | FirstTimeUser | char(1) |
| | | LoginStatus | char(1) |

APPENDIX-continued

EXEMPLARY DATABASE TABLES

| Sno | Table Name | Column Name | Data Type |
|---|---|---|---|
|  |  | LoginTime | datetime |
|  |  | LogoutTime | datetime |
|  |  | CreatedOn | datetime |
|  |  | CreatedBy | varchar(30) |
|  |  | ModifiededOn | datetime |
|  |  | ModifiedBy | varchar(30) |
|  |  | WebCam | char(1) |
|  |  | Live | char(1) |
| 67 | F26_UserRoleMainMenu | MainMenuId | int(PK) |
|  |  | MenuName | varchar(50) |
|  |  | DisplayOrder | int |
|  |  | CreatedOn | datetime |
|  |  | CreatedBy | varchar(30) |
|  |  | ModifiededOn | datetime |
|  |  | ModifiedBy | varchar(30) |

What is claimed is:

1. A data processing system for managing discovery in connection with a legal proceeding, comprising:
at least one data processor coupled in a digital data communication network to a plurality of terminal devices, the data processor having access to a data memory configured to maintain a database and being programmed to execute instructions;
wherein the database is configured to maintain information for determining discovery specifications for at least two adverse parties to said legal proceeding, wherein the specifications for the at least two adverse parties at least partly correspond and can be compared;
wherein the data processor is programmed upon initiation by an administrator to execute a process for questioning at least one of managers, employees and data custodians of at least one of the adverse parties to the legal proceeding, and to populate the database from responses of the managers, employees and data custodians, with information defining the party and identifying stores of documents, data and the things that are candidates for potential evidence of the party;
wherein the data processor is further programmed for one of analyzing and processing the potential evidence according to a specification, and thereby assessing at least one of a volume of evidence responsive to at least one query, a cost of responding to the query in at least one output format, and a time requirement according to said specification;
wherein the administrator is enabled by the programming of the data processor to test alternative said specifications for the adverse parties and to obtain corresponding assessments.

2. The data processing system for managing discovery of claim 1, wherein of the administrator is enabled by the programming of the data processor to test the alternative specifications for assessing at least one of a volume of evidence, a data type, a data content, an accessibility of data, a cost of responding, and a time requirement, and to produce a report.

3. The data processing system for managing discovery of claim 1, wherein the process for questioning at least one of managers, employees and data custodians of the party includes prompting for information defining at least one of a relationship of operational entities, a management hierarchy of the party and an association of persons with sources of potential evidence, and extending the process of questioning to include questioning the operational entities, hierarchy and persons.

4. The data processing system for managing discovery of claim 1, wherein the stores of documents, data and the things that are candidates for potential evidence of the party are chosen from the group consisting of management information, information technology system configuration and content, paper and electronic documents and document management systems, internal and external paper, email and physical or electronic representations of messages, factual, audio and audiovisual recordings, medical and physical reports and test results, accounts payable, accounts receivable, job recording, billing records, payment records, sales information, security data, physical evidence, and persons having knowledge of selected persons, places, occurrences and things.

5. The data processing system for managing discovery of claim 1, wherein the data store includes electronically stored information and the attributes of the data store defined in the database include at least one of a term index associated with a part of the data store, at least a summary report of hits that could be reported according to selection criteria associated with the discovery requests, a definition of one or more native formats of items in the electronically stored information, metadata associated with the electronically stored information, a dictionary of metadata definitions at least partly describing said metadata and a security level for the electronically stored information.

6. The data processing system for managing discovery of claim 1, further comprising a reference information source containing information accessible to users, categorizing items in the electronically stored information, and wherein the reference information source includes information informing the users of aspects of the items stored in particular programs.

7. The data processing system for managing discovery of claim 6, wherein the reference information source includes a definition of aspects of metadata contained in a set of commonly encountered programs.

8. The data processing system for managing discovery of claim 5, wherein the security level is chosen from the group consisting of technical trade secrets and know-how, sensitive business and competitive information, attorney-client privileged communications and work product.

9. The data processing system for managing discovery of claim 1, wherein the data processor is configured to maintain at least one of a separation and a security access restriction between information associated with respective said information for the at least two adverse parties.

10. The data processing system for managing discovery of claim 1, wherein the data processor is configured for substantially concurrently processing information for plural parties in plural legal proceedings independently, the data processor maintaining one of a separation and a security access restriction between information associated with respective said plural parties.

11. The data processing system for managing discovery of claim 1, wherein the database includes fields associated with tentative discovery specifications applicable to at least two parties to the legal proceeding, the tentative discovery specifications defining a set of input and output attributes under which a query applied to the potential evidence produces a result, and wherein the processor is programmed to produce at least one report from which at least one of costs and benefits associated with alternatives for the tentative discovery specifications can be compared.

12. The data processing system for managing discovery of claim 11, wherein the data processor is configured to accept tentative discovery specifications posited by either of two adverse parties to the legal proceeding for application to the potential evidence of an other of the adverse parties, and to produce said report from which at least one of the costs and benefits associated with the tentative discovery specifications posited by the adverse parties can be compared.

13. The data processing system for managing discovery of claim 11, wherein the data processor is operable to produce a report of agreed points upon which two adverse parties to the legal proceeding indicate agreement to a specification governing discovery, wherein the report is configured to report points on which the adverse parties decline to agree.

14. The data processing system for managing discovery of claim 13, wherein the data processor is programmed to manage a meet-and-confer session wherein the adverse parties are prompted to indicate agreement to the agreed points.

15. The data processing system for managing discovery of claim 14, wherein the meet-and-confer session is managed as a multi-user teleconference and further comprising input devices by which at least one of text, audio, video and data file argument is accepted from an offering one of the adverse parties in advocacy of at least one point of the specification, and wherein the data processing system incorporates at least part of the argument in the report.

16. The data processing system for managing discovery of claim 15, wherein the report is rendered in a standardized format for presentation to a court.

17. A method for managing discovery in a legal proceeding, comprising:
establishing a data processing system in data communication with each of at least two adverse parties to the legal proceeding, over a data network;
for at least one of the adverse parties, electronically distributing a questionnaire prompting at least one representative for information identifying and defining information custodians and information that is subject to discovery in the legal proceeding;
establishing a database accessible to the data processing system wherein the information subject to discovery is qualified and quantified;
providing a process for assessing the application of discovery specifications to the database, the discovery specifications including a definition of one of a scope of input from the information subject to discovery, a processing step by which the information subject to discovery is one of classified, quantified, queried, selected, redacted, altered, indexed, numbered, reformatted, and a defined format by which a result shall be stored as output;
applying the process for assessing the application of discovery specifications to the database according to at least two alternative discovery specifications that differ in at least one criterion, and comparing the at least two alternative discovery specifications with respect to at least one of a quality, quantity, cost requirement and time requirement;
reporting to at least one of the adverse parties a report as to a result of comparing the at least two alternative discovery specifications;
conducting a negotiation between the adverse parties wherein a least part of the report is communicated between the adverse parties in advocating or opposing one of the at least two alternative discovery specifications.

18. The method of claim 17, further comprising at least partially populating the database for at least two said adverse parties and comparing discovery specifications offered by each of the parties to the other party and demanded by each of the parties of the other party, and further comprising mediating the negotiation by reporting to the parties an effect of acceding to a point proposed or demanded by the other party.

19. The method of claim 18, further comprising conducting a meet-and-confer session as a final step in the negotiation and recording via the data processing system points of agreement and disagreement regarding the specifications applicable to the respective adverse parties.

20. The method of claim 19, further comprising recording via the data processing system arguments and exhibits presented by the respective parties during the meet-and-confer session and generating a report for submission to a court documenting discovery issues remaining to be resolved after the meet-and-confer session.

21. The method of claim 17, further comprising operating the data processing system for substantially concurrently service of adverse parties in plural legal proceedings that can be unrelated, and separately and securely maintaining fields in the database for each of the adverse parties served.

22. The method of claim 17, further comprising employing the data processing system for executing queries against the information that is subject to discovery in the legal proceeding and producing the output according to an agreed discovery specification.

23. A non-transitory programmed data carrier,
wherein the data carrier contains only non-transitory data, and includes non-transitory executable coding that when executed by a data processor is operable for managing discovery in a legal proceeding to accomplish a method comprising:
establishing a data processing system in data communication with each of at least two adverse parties to the legal proceeding, over a data network;
for at least one of the adverse parties, electronically distributing a questionnaire prompting at least one representative for information identifying and defining information custodians and information that is subject to discovery in the legal proceeding;
establishing a database accessible to the data processing system wherein the information subject to discovery is qualified and quantified;
providing a process for assessing the application of discovery specifications to the database, the discovery specifications including a definition of one of a scope of input from the information subject to discovery, a processing step by which the information subject to discovery is one of classified, quantified, queried, selected, redacted, altered, indexed, numbered, reformatted, and a defined format by which a result shall be stored as output;

applying the process for assessing the application of discovery specifications to the database according to at least two alternative discovery specifications that differ in at least one criterion, and comparing the at least two alternative discovery specifications with respect to at least one of a quality, quantity, cost requirement and time requirement;

reporting to at least one of the adverse parties a report as to a result of comparing the at least two alternative discovery specifications;

conducting a negotiation between the adverse parties wherein a least part of the report is communicated between the adverse parties in advocating or opposing one of the at least two alternative discovery specifications.

* * * * *